US010039019B2

(12) United States Patent
Mufti

(10) Patent No.: US 10,039,019 B2
(45) Date of Patent: Jul. 31, 2018

(54) TELECOMMUNICATIONS NETWORK NON-ESTABLISHMENT RESPONSE

(71) Applicant: T-Mobile USA, Inc., Bellevue, WA (US)

(72) Inventor: Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/689,318

(22) Filed: Apr. 17, 2015

(65) Prior Publication Data

US 2016/0029228 A1 Jan. 28, 2016

Related U.S. Application Data

(60) Provisional application No. 62/028,623, filed on Jul. 24, 2014.

(51) Int. Cl.
*H04W 24/04* (2009.01)
*H04W 76/19* (2018.01)
(Continued)

(52) U.S. Cl.
CPC ....... *H04W 24/04* (2013.01); *H04W 36/0022* (2013.01); *H04W 76/028* (2013.01); *H04W 76/19* (2018.02)

(58) Field of Classification Search
CPC ........... H04L 29/12188; H04L 61/1588; H04L 65/1006; H04L 65/1016; H04L 65/105;
(Continued)

(56) References Cited

U.S. PATENT DOCUMENTS 7,257,374 B1 8/2007 Creigh
8,655,357 B1 2/2014 Gazzard et al.
(Continued)

FOREIGN PATENT DOCUMENTS

CN 103561432 2/2014
EP 2667659 11/2013
(Continued)

OTHER PUBLICATIONS

"3GPP TS 24.229 V10.9.0", 3rd Generation Partnership Project; Technical Specification Group Core Network and Terminals; IP multimedia call control protocol based on Session Initiation Protocol (SIP) and Session Description Protocol (SDP); Stage 3 (Release 10), retrieved at <http://www.3gpp.org/DynaReport/24229.htm>>, Jun. 27, 2014, pp. 1-24, 58-59, 96-109, 145-151, and 216-218.
(Continued)

*Primary Examiner* — Jamal Javaid
*Assistant Examiner* — Rose Clark
(74) *Attorney, Agent, or Firm* — Lee & Hayes, PLLC

(57) ABSTRACT

Telecommunication network components configured to manage a pre-establishment phase of a communication session of user equipment are described herein. The components may receive a session-failure indication, e.g., during the pre-establishment phase. The components may determine action data based at least in part on the received session-failure indication. In response to the action data indicating a retry, the components may re-initiate the communication session via an access network indicated in the action data. User equipment may transmit a session-failure indication indicative of a detected failure condition preventing establishment of the communication session.

20 Claims, 11 Drawing Sheets

(51) Int. Cl.
*H04W 36/00* (2009.01)
*H04W 76/02* (2009.01)

(58) Field of Classification Search
CPC . H04L 65/1069; H04L 65/1083; H04L 67/14; H04L 2012/6486; H04W 24/04; H04W 36/0005; H04W 36/0011; H04W 36/0016; H04W 36/0022; H04W 36/14; H04W 36/16; H04W 36/24; H04W 36/30; H04W 36/38; H04W 48/18; H04W 64/00; H04W 76/02; H04W 76/026; H04W 76/027; H04W 76/028; H04W 8/12; H04W 80/10; H04W 88/06; H04W 36/02; H04W 76/025; H04W 76/045; H04W 76/064
See application file for complete search history.

(56) References Cited

U.S. PATENT DOCUMENTS

| | | | |
|---|---|---|---|
| 8,718,636 B1* | 5/2014 | Pankajakshan | H04W 24/08 455/403 |
| 8,879,503 B2* | 11/2014 | Dwyer | H04W 48/18 370/331 |
| 8,995,959 B2 | 3/2015 | Cakulev et al. | |
| 2004/0199641 A1 | 10/2004 | Bajko | |
| 2004/0199649 A1 | 10/2004 | Tarnanen et al. | |
| 2005/0071679 A1 | 3/2005 | Kiss et al. | |
| 2006/0084438 A1 | 4/2006 | Kwon | |
| 2006/0239229 A1 | 10/2006 | Marinescu et al. | |
| 2008/0039085 A1 | 2/2008 | Phan-Anh | |
| 2008/0089272 A1 | 4/2008 | Ahokangas | |
| 2008/0091814 A1* | 4/2008 | Xie | H04L 67/143 709/223 |
| 2008/0126535 A1 | 5/2008 | Zhu et al. | |
| 2008/0208937 A1 | 8/2008 | Yukumoto | |
| 2008/0299927 A1 | 12/2008 | Tenbrook et al. | |
| 2009/0017824 A1 | 1/2009 | Lee et al. | |
| 2009/0068996 A1 | 3/2009 | Bakker et al. | |
| 2009/0296566 A1* | 12/2009 | Yasrebl | H04L 41/5087 370/221 |
| 2009/0296567 A1* | 12/2009 | Yasrebi | H04L 29/12028 370/221 |
| 2010/0054209 A1 | 3/2010 | Mahdi | |
| 2010/0223492 A1* | 9/2010 | Farrugia | H04L 65/1016 714/4.1 |
| 2010/0311386 A1 | 12/2010 | Edge et al. | |
| 2010/0329243 A1 | 12/2010 | Buckley et al. | |
| 2010/0329244 A1 | 12/2010 | Buckley et al. | |
| 2011/0013597 A1 | 1/2011 | Hwang et al. | |
| 2011/0040836 A1 | 2/2011 | Allen et al. | |
| 2011/0040882 A1* | 2/2011 | Delos Reyes | H04L 65/1069 709/228 |
| 2011/0058520 A1 | 3/2011 | Keller et al. | |
| 2011/0230192 A1 | 9/2011 | Tiwari | |
| 2011/0296034 A1 | 12/2011 | Mayer et al. | |
| 2012/0039303 A1 | 2/2012 | Stenfelt et al. | |
| 2012/0063420 A1 | 3/2012 | Long et al. | |
| 2012/0069731 A1 | 3/2012 | Tooher et al. | |
| 2012/0083240 A1 | 4/2012 | Patel | |
| 2012/0172042 A1* | 7/2012 | Drevon | H04W 36/385 455/436 |
| 2012/0236709 A1* | 9/2012 | Ramachandran | H04W 76/027 370/221 |
| 2012/0258712 A1* | 10/2012 | Rozinov | H04L 61/1535 455/435.1 |
| 2012/0295617 A1* | 11/2012 | Anchan | H04W 76/005 455/435.1 |
| 2013/0021998 A1* | 1/2013 | Shatsky | H04W 28/26 370/329 |
| 2013/0023265 A1* | 1/2013 | Swaminathan | H04W 76/027 455/423 |
| 2013/0024574 A1 | 1/2013 | Lau et al. | |
| 2013/0029629 A1 | 1/2013 | Lindholm et al. | |
| 2013/0051362 A1 | 2/2013 | Lee et al. | |
| 2013/0143565 A1 | 6/2013 | Zisimopoulos et al. | |
| 2013/0151586 A1* | 6/2013 | Morishige | H04L 65/1006 709/203 |
| 2013/0174254 A1 | 7/2013 | Gould et al. | |
| 2013/0183965 A1* | 7/2013 | Ramachandran | H04W 48/20 455/434 |
| 2013/0195076 A1 | 8/2013 | Keller et al. | |
| 2013/0329567 A1* | 12/2013 | Mathias | H04W 36/30 370/242 |
| 2014/0051443 A1 | 2/2014 | Diachina et al. | |
| 2014/0064156 A1 | 3/2014 | Paladugu et al. | |
| 2014/0143393 A1 | 5/2014 | Martinez Perea et al. | |
| 2014/0176660 A1 | 6/2014 | Khay-Ibbat et al. | |
| 2014/0219241 A1 | 8/2014 | Parron | |
| 2014/0370842 A1 | 12/2014 | Abtin et al. | |
| 2014/0378105 A1 | 12/2014 | Suryavanshi | |
| 2015/0003342 A1* | 1/2015 | Swaminathan | H04W 88/06 370/329 |
| 2015/0016420 A1 | 1/2015 | Balabhadruni et al. | |
| 2015/0024751 A1 | 1/2015 | Wong et al. | |
| 2015/0382251 A1* | 12/2015 | Wang | H04W 36/0022 455/439 |
| 2016/0021579 A1 | 1/2016 | Mufti | |
| 2016/0021580 A1 | 1/2016 | Mufti | |
| 2016/0037390 A1 | 2/2016 | Mufti et al. | |
| 2016/0037471 A1 | 2/2016 | Mufti | |
| 2016/0149965 A1 | 5/2016 | Kubik et al. | |
| 2016/0150497 A1* | 5/2016 | Janosi | H04L 65/1016 455/435.1 |
| 2016/0234744 A1* | 8/2016 | Wu | H04W 36/0022 |
| 2016/0249401 A1* | 8/2016 | Tanaka | H04M 3/00 |
| 2016/0286516 A1 | 9/2016 | Wu | |

FOREIGN PATENT DOCUMENTS

| | | |
|---|---|---|
| KR | 1020090065320 | 6/2009 |
| KR | 1020100102363 | 9/2010 |
| WO | 2007047477 | 4/2007 |
| WO | 2012062379 | 5/2012 |
| WO | 2013075746 | 5/2013 |
| WO | 2013104651 | 7/2013 |
| WO | 2013114158 | 8/2013 |
| WO | 2013156061 | 10/2013 |
| WO | WO2014101500 | 7/2014 |
| WO | WO2014124658 | 8/2014 |
| WO | WO2014183668 A1 | 11/2014 |

OTHER PUBLICATIONS

PCT Search Report and Written Opinion dated Oct. 13, 2015 for PCT Application No. PCT/US15/38634, 11 pages.
PCT Search Report and Written Opinion dated Oct. 15, 2015 for PCT Application No. PCT/US15/38652, 14 pages.
PCT Search Report and Written Opinion dated Oct. 19, 2015 for PCT Application No. PCT/US15/39414, 12 pages.
PCT Search Report and Written Opinion dated Nov. 11, 2015 for PCT Application No. PCT/US15/43467, 12 pages.
PCT Search Report and Written Opinion dated Nov. 27, 2015 for PCT Application No. PCT/US15/43454, 10 pages.
Office action for U.S. Appl. No. 14/552,945, dated May 18, 2016, Mufti, "Telecommunication Equipment Measuring Pre-Establishment Service Interruptions", 29 pages.
Office action for U.S. Appl. No. 14/815,831, dated May 19, 2016, Mufti et al., "Telecommunications Network Emergency-Call Handover", 15 pages.
"Digital cellular telecommunications system (Phase 2+); Universal Mobile Telecommunications System (UMTS); LTE; Mobile radio interface signalling layer 3;" General Aspects. 3GPP TS 24.007 V9.0.0. Oct. 2010. pp. 13, 15-17, 106-107.
Office action for U.S. Appl. No. 14/552,871, dated Oct. 6, 2016, Mufti, "Telecommunication Network Pre-Establishment Service Interruption Response", 23 pages.
Office action for U.S. Appl. No. 14/552,945, dated Nov. 30, 2016, Mufti, "Telecommunication Equipment Measuring Pre-Establishment Service Interruptions", 28 pages.

(56) References Cited

OTHER PUBLICATIONS

Office action for U.S. Appl. No. 14/815,831, dated Dec. 2, 2016, Mufti et al., "Telecommunications Network Emergency-Call Handover", 13 pages.
Office action for U.S. Appl. No. 14/552,871, dated Feb. 10, 2017, Mufti, "Telecommunication Network Pre-Establishment Service Interruption Response", 23 pages.
The Extended European Search Report dated Sep. 27, 2017 for European Patent Application No. 15821476.7, 16 pages.
Ericsson, "Clarification of Conditions for Transfer of Calls in an Early Phase", retrieved on Mar. 3, 2014 at <<http://www.3gpp.org/ftp/Meetings_3GPP_SYNC/CT/CT/Docs/>, 3GPP Draft, 3rd Generation Partnership Project, Mobile Competence Centre, France, vol. CT WG1, No Guangzhou Jan. 20, 2014-Jan. 24, 2014, Jan. 2014, 9 pages.
Nsn, et al., "Correct Request for PS to CS Cancelled Handling", retrieved on Mar. 3, 2014 at <<http://www.3gpp.org/ftp/Meetings_3GPP_SYNC/CT/CT/Docs/>>, 3GPP Draft, 3rd Generation Partnership Project, Mobile Competence Centre, France, vol. CT WG1, No Guangzhou Jan. 20, 2014-Jan. 24, 2014, Jan. 2014, 3 pages.
Office Action for U.S. Appl. No. 14/552,871, dated Sep. 21, 2017, Mufti, "Telecommunication Network Pre-Establishment Service Interruption Response" 28 pages.
Office action for U.S. Appl. No. 14/568,633, dated Apr. 12, 2017, Mufti, "Suppressing Third Party Registration and Third Party Deregistration Actions", 16 pages.
Office action for U.S. Appl. No. 14/552,871, dated May 25, 2017, Mufti, "Telecommunication Network Pre-Establishment Service Interruption Response", 27 pages.
Office action for U.S. Appl. No. 14/689,318, dated Jun. 1, 2017, Mufti, "Telecommunications Network Non-Establishment Response", 18 pages.
Office Action for U.S. Appl. No. 14/552,945, dated Aug. 31, 2017, Shujaur Mufti, "Telecommunication Equipment Measuring Pre-Establishment Service Interruptions", 35 pages.
The Extended Euroepan Search Report dated Jan. 30, 2018 for European patent application No. 15829069.2, 15 pages.
Lucent Technologies, "Filter criteria matching and generation of third-Party Register request for network-initiated derigstration", 3GPP Draft; N1-050222, 3rd Generation Partnership Project (3GPP), Mobile Competence, France, vol. TSG CN, No. Sydney, Australia; Mar. 2, 2005, retrieved on Mar. 2, 2005, 5 pgs.
Nokia, "Third party registration optimisation", 3GPP Draft; N1-041441_3RDPARTYREGOPT-A, 3rd Generation Partnership Project (3GPP), France, vol. CN WG1, No. Sophia Antipolis, France, Aug. 10, 2004. retrieved on Aug. 10, 2004, 7 pgs.
The Chinese Office Action dated Dec. 8, 2017 for Chinese patent application No. 201580051477.5, a counterpart foreign application of U.S. Pat. No. 9,699,211, 15 pgs.
The Extended Euroepan Search Report dated Feb. 13, 2018 for European patent application No. 15824514.2, 12 pages.
The Extended Euroepan Search Report dated Feb. 19, 2018 for European patent application No. 15830023.6, 12 pages.
Nokia Siemens Networks et al: "Multiple EATF addressing",3GPP Draft; S2-113311, vol. SA WG2, no. Naantali; Jul. 11, 2011, Jul. 5, 2011, XP050548597, 2 pages.
DoCoMo, et al., "Handover Cancellation Timing", 3GPP Draft; 3rd Generation Partnership Project, Mobile Competence Centre, France, vol. RAN WG3, No. Kansas City, USA; Apr. 30, 2008, 3 pgs.
The Extended European Search Report dated Dec. 15, 2017 for European patent application No. 15822829.6, 16 pages.
Office action for U.S. Appl. No. 14/552,871, dated Jan. 11, 2018, Mufti, "Telecommunication Network Pre-Establishment Service Interruption Response", 19 pages.
Office action for U.S. Appl. No. 14/568,633, dated Oct. 19, 2017, Mufti, "Suppressing Third Party Registration and Third Party Deregistration Actions", 17 pages.
Office action for U.S. Appl. No. 14/568,633, dated Apr. 11, 2018, Mufti, "Suppressing Third Party Registration and Third Party Deregistration Actions", 21 pages.
Office action for U.S. Appl. No. 14/552,871, dated Apr. 19, 2018, Mufti, "Telecommunication Network Pre-Establishment Service Interruption Response", 6 pages.
Chinese Office Action dated May 8, 2018 for Chinese patent application No. 201580051477.5, a counterpart foreign application of U.S. Pat. No. 9,699,211, 5 pgs.

\* cited by examiner

TELECOMMUNICATIONS NETWORK NON-ESTABLISHMENT RESPONSE

CROSS-REFERENCE TO RELATED APPLICATION

This application is a nonprovisional application of, and claims priority to and the benefit of, U.S. Patent Application Ser. No. 62/028,623, filed Jul. 24, 2014 and entitled "VoLTE Error Codes," the entirety of which is incorporated herein by reference.

BACKGROUND

Use of packet-switched connections for transmitting synchronous communications, such as voice calls, and data across telecommunications networks is increasing. Such packet-switched connections allow for greater speed and throughput than do circuit-switched connections, and also make packet-switched data from other networks, such as the Internet, more readily available. Voice over Long Term Evolution (VoLTE) is a widely-used standard for transmission of voice calls over packet-switched connections.

Many telecommunications networks, however, still utilize access networks that provide circuit-switched connections, such as Global System for Mobile Communications (GSM) networks or Universal Mobile Telecommunications System (UMTS) networks, due to the substantial infrastructure investment needed to expand packet-switched access networks. Such circuit-switched access networks can provide speed or quality comparable to, or, at times, better than, the speed or quality of packet-switched access networks for some types of data, including synchronous communications such as full-duplex voice communications. Moreover, some telecommunications networks can utilize packet-switched access networks without any underlying circuit-switched access network, such as deployments of packet-switched service using the 700 MHz band formerly occupied by analog television broadcasts.

Because packet-switched access networks and circuit-switched access networks are sometimes available in different areas or at different times, a communication session can use multiple types of networks, e.g., as a user moves while talking on a cellular telephone. Techniques have thus been developed for moving communication sessions from packet-switched access networks, e.g., the Long Term Evolution (LTE) access network, to circuit-switched access networks, e.g., the GSM or UMTS access network, while maintaining continuity of the communication session, such as a voice call. One technique for such "handover" of a communication session from a LTE access network to a circuit-switched access network involves the use of the single radio voice call continuity (SRVCC) standard produced by the Third Generation Partnership Project (3GPP). With SRVCC, an eNodeB of a LTE access network determines that a communication session handover should occur based on a measurement report received from user equipment. The eNodeB communicates this to a mobility management entity (MME), which makes a handover request of a mobile switching center (MSC) server of a circuit-switched access network that is available to the user equipment. The MSC server (MSS) then prepares the circuit-switched access network for the handover, and communicates with an Internet Protocol (IP) multimedia subsystem (IMS) of the telecommunications network, the IMS maintaining continuity for the communication session during the handover. The MSS then sends a handover response to the MME, and the MME instructs the user equipment to connect to the circuit-switched access network to continue the communication session. Handovers can occur at various times throughout a communication session.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

This disclosure describes, in part, a telecommunications network configured to manage failures during a pre-establishment phase of a communication session of user equipment. The user equipment can be a cellular telephone, such as a feature phone or smartphone. In some examples, the user equipment can receive an invitation message of a communication session with another device via a first access network, wherein a pre-alerting phase follows or commences with the receipt of the invitation message and precedes transmission of an alerting-progress message; transmit, in response to the received invitation message and during the pre-alerting phase, a preconditions message; subsequently detect, during the pre-alerting phase, a failure condition preventing establishment of the communication session; transmit, in response to the detection of the failure condition, an error code indicative of the failure condition; and subsequently receive a second invitation message of the communication session via a second access network. The telecommunications network device can receive session-progress information of a communication session with the user equipment; subsequently receive a session-failure indication; determine action data based at least in part on the received session-failure indication; and, in response to the action data indicating a retry, re-initiate the communication session via an access network indicated in the action data.

Figure 1:
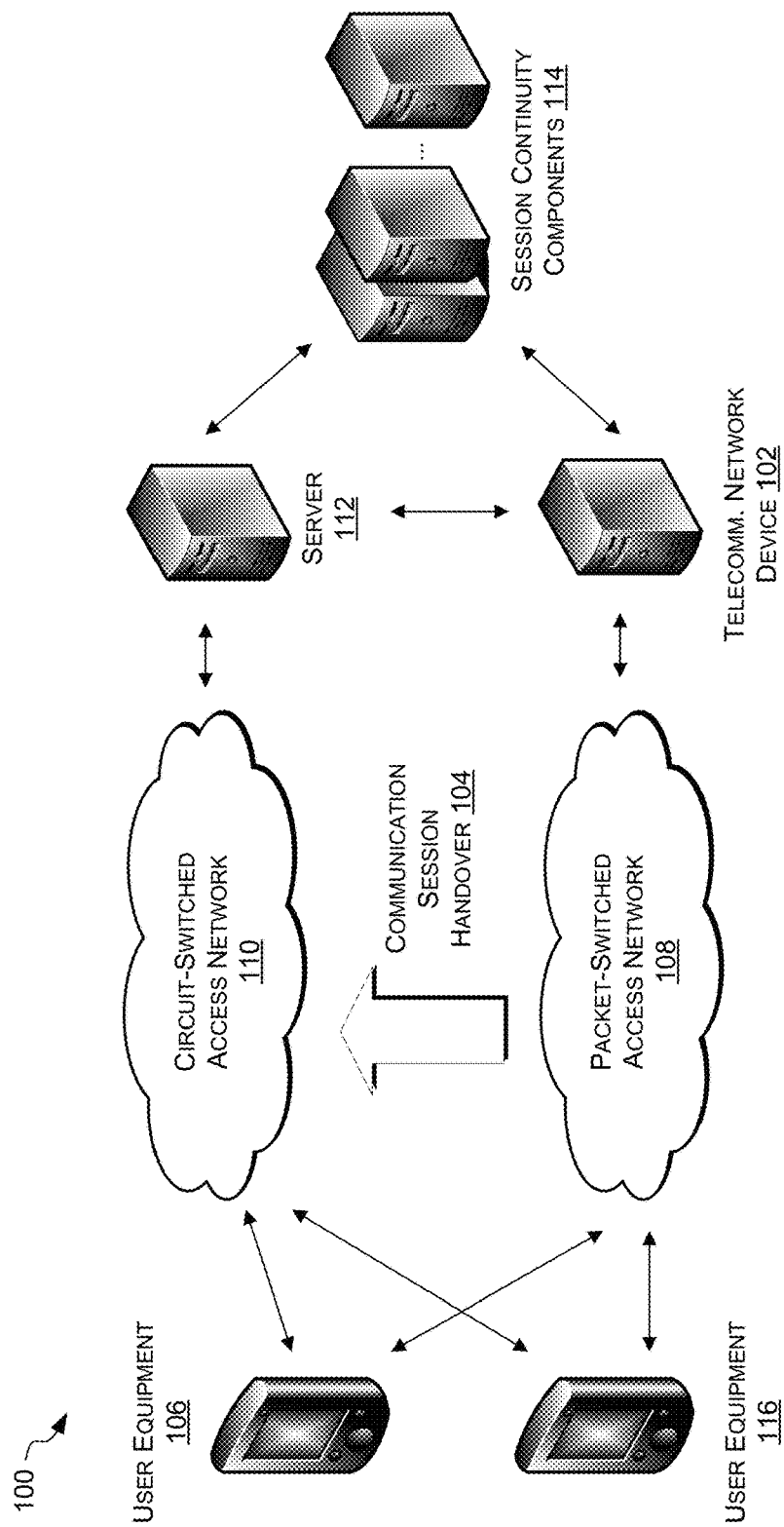
FIG. 1 illustrates an overview of devices involved in a handover of a communication session of user equipment, e.g., from a packet-switched access network to a circuit-switched access network.

FIG. 1 illustrates an overview 100 of devices involved in establishment (also referred to as "setup") of a communication session and in handover of a communication session of user equipment, e.g., from a packet-switched (PS) access network to a circuit-switched (CS) access network. As shown in FIG. 1, a telecommunications network device 102 can trigger a handover 104 of a communication session of user equipment 106 from a PS access network 108 to a CS access network 110. The CS access network 110 can be any sort of CS access network 110, such as a GSM or UMTS network. The CS access network 110 can also be referred to as a universal terrestrial radio network (UTRAN) or a GSM EDGE radio access network (GERAN) and can include a base station or NodeB, as well as a radio network controller (RNC). The PS access network 108 or the CS access network 110 can provide connections over a given signal spectrum and can use any sort of air interface, such as a code division multiple access (CDMA), time division multiple access (TDMA), or frequency division multiple access (FDMA) air interface.

As part of the handover 104, the telecommunications network device 102 (e.g., an MME) can provide a handover request to a server 112 (e.g., an MSS) that is associated with the CS access network 110. The server 112 can then prepare the CS access network 110 for the handover 104 and communicate with one or more session continuity components 114 to ensure continuity of the communication session during the handover 104. The server 112 then responds to the telecommunications network device 102, and the telecommunications network device 102 instructs the user equipment 106 to connect to the CS access network 110 to continue the communication session.

Throughout this disclosure, some examples of handover 104 are described in the context of a handover from PS access network 108 to CS access network 110. However, handover 104 is not limited to that example. Handover 104 in various examples can be a handover from CS access network 110 to PS access network 108, between two different PS access networks 108, between two different CS networks 110, or in general between first and second access networks of a selected type or between a first access network of a first type and a second access network of a second, different type. Moreover, a communication session can be established via an access network of any type, e.g., a PS type or a CS type.

Figure 4:
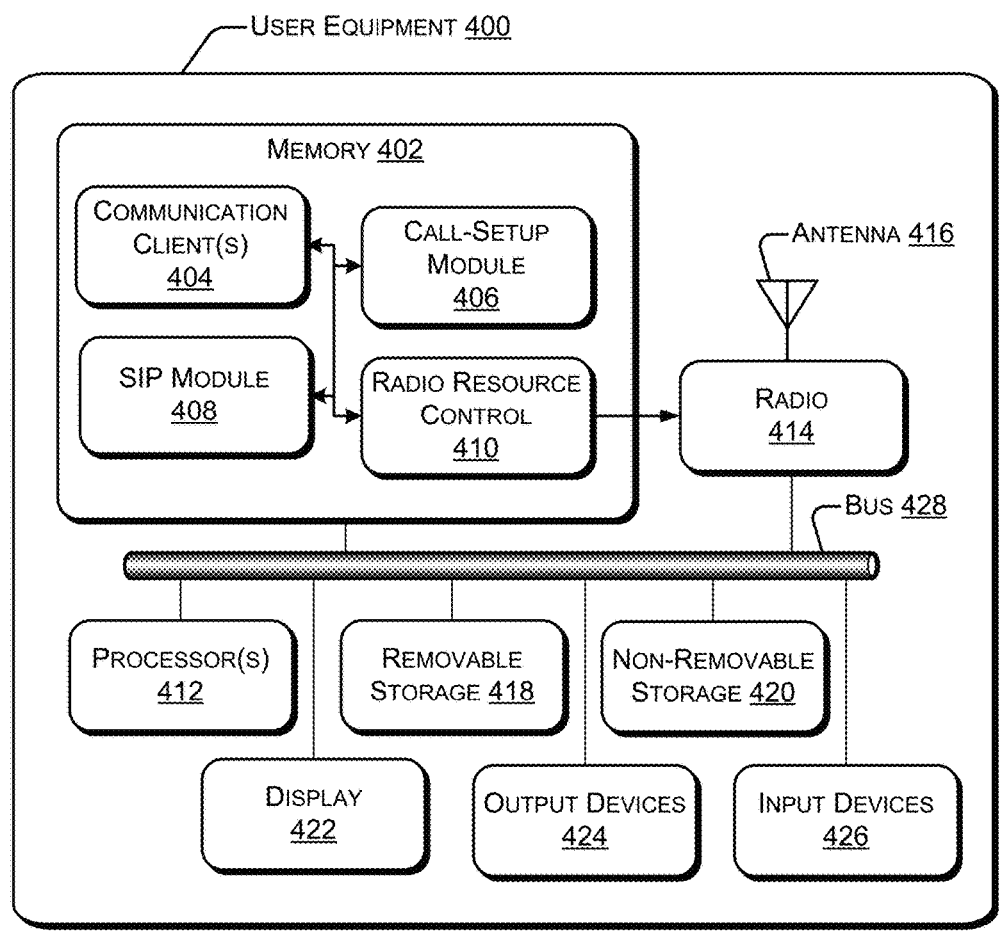
FIG. 4 illustrates a component level view of user equipment useful with various examples.

The user equipment 106 can be any sort device capable of cellular or wireless network communication, such as a cellular phone, a tablet computer, a personal digital assistant (PDA), a personal computer (PC), a laptop computer, a media center, a work station, etc. An example of user equipment 106 is illustrated in FIG. 4 and described below with reference to that figure.

In some embodiments, the user equipment 106 can have a radio and be configured to tune that radio to licensed wireless spectrum utilized by PS access networks, such as LTE access networks, e.g., in the band class 12 region of the 700 MHz frequency band. The user equipment 106 can also be configured to tune the radio to wireless spectrum utilized by CS access networks, such as GSM access networks or UMTS access networks. When equipped with a single radio, the user equipment 106 can be connected to exactly one of these access networks at a time.

The user equipment 106 can further be configured to establish or receive a communication session, such as a VoLTE or other voice call, a video call, or another sort of synchronous communication. Establishment of such sessions can involve communication clients and Session Initiation Protocol (SIP) clients to communicate with session continuity components 114 of the telecommunications network. For example, user equipment 106 can transmit a SIP INVITE via telecommunications network device 102.

In some examples, a communication session can be cancelled, e.g., on a first access network, and re-initiated, e.g., on a second access network. This can be transparent to the user; that is, a person using user equipment 106 can experience a communication session substantially free of any indication that a cancellation and re-initiation has occurred. Alternatively, any user-perceptible indication can be transitory, e.g., interruptions in audio of a voice call lasting less than one second. Handover 104 can include a cancellation and re-initiation managed by components of the telecommunications network (e.g., telecommunications network device 102, server 112, or session continuity components 114).

In various embodiments, the user equipment 106 can measure access networks that are proximate to the user equipment 106 and provide measurements of those access networks in a measurement report to a device of the telecommunications network, such as telecommunications network device 102. The measurements can include signal strength, packet loss, packet discard, or network congestion. The proximate access networks can include both access networks that are detected by the user equipment 106 and those of neighboring cells, which the user equipment 106 can learn of from the telecommunications network.

The user equipment 106 can establish the communication session using a connection to the PS access network 108. The access network 108 can be secured using, for example, information from a SIM card of the user equipment 106, or can be unsecure. The access network 108 connects the user equipment 106 to a telecommunications network. A routing device of the access network 108 can communicate with a device of the telecommunications network, such as the telecommunications network device 102.

Figure 5:
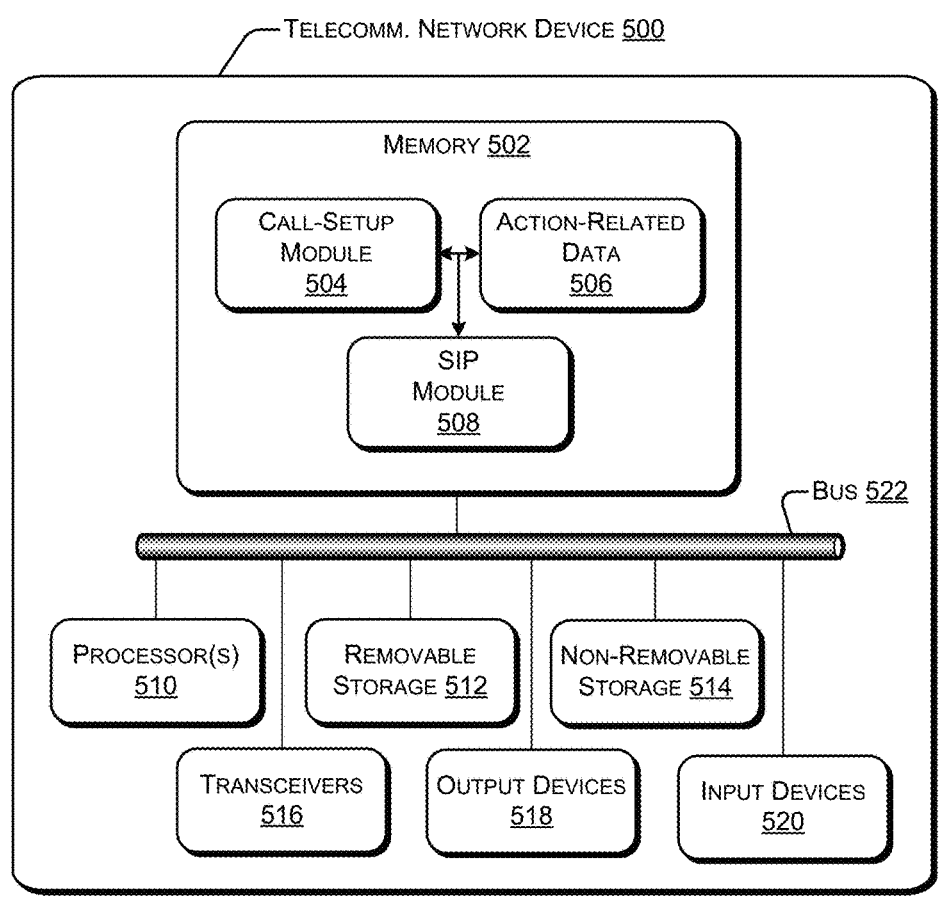
FIG. 5 illustrates a component level view of a telecommunications network device capable of establishing a communication session of user equipment or handover of the communication session, e.g., from a packet-switched access network to a circuit-switched access network.

The telecommunications network device 102 can be a gateway device, such as an Evolved Packet Data Gateway (ePDG). An example telecommunications network device 102 is illustrated in FIG. 5 and described below with reference to that figure. Further, the telecommunications network device 102, as well as the server 112 and the session continuity components 114, can each be or include a server or server farm, multiple, distributed server farms, a mainframe, a work station, a personal computer (PC), a laptop computer, a tablet computer, an embedded system, or any other sort of device or devices. In one implementation, one or more of telecommunications network device 102, the server 112, and the session continuity components 114 can represent a plurality of computing devices working in communication, such as a cloud computing network of nodes. Also, the telecommunications network device 102, the server 112, and the session continuity components 114 can each be or include devices of a telecommunications network. Examples of the telecommunications network device 102, the server 112, and the session continuity components 114 are illustrated in FIG. 5 and are described in greater detail with reference to that figure.

In various embodiments, the telecommunications network device 102 can enable the user equipment 106 to initiate the communication session by passing messages to appropriate device(s) of the telecommunications network, such as the session continuity components 114. The telecommunications network device 102 can also receive measurement reports from the user equipment 106 and can apply one or more models, thresholds, rules, or criteria to the measurements included in the measurement reports to determine whether a handover 104 is appropriate. The telecommunications network device 102 can additionally or alternatively send instructions to the user equipment 106 preparing the user equipment 106 for the handover 104.

Upon initiating a handover 104, the telecommunications network device 102 selects a CS access network 110 to transition the communication session to, e.g., based on signal congestion levels of the CS access networks included in the measurement report. The telecommunications network device 102 can then determine the server 112 associated with the selected CS access network 110 by referencing mappings, such as a table.

The telecommunications network device 102 then sends a handover request, such as a SRVCC packet-switched (PS) to circuit-switched (CS) request, e.g., to the server 112. The handover request can include at least information identifying the user equipment 106, such as an international mobile subscriber identity (IMSI), information identifying the communication session, such as a correlation mobile station international subscriber directory number (C-MSISDN), and an identifier of the session continuity components 114, such as a session transfer number-single radio (STN-SR).

Upon receiving a handover request, the server 112 prepares the CS access network 110 for the handover 104 by, for example, allocating resources at a base station and RNC of the CS access network 110. The server 112 also uses the identifier of the session continuity components 114 included in the handover request to request that the session continuity components perform a session transfer. The session transfer enables the handover 104 to occur without loss of continuity to the communication session.

In various embodiments, the session continuity components 114 represent components of an IMS of the telecommunications network. Examples of such components, and of the session transfer, are described further herein. Upon receiving a session transfer request from the server 112 and performing the session transfer, the session continuity components 114 respond to the server 112, indicating completion of the session transfer.

In further embodiments, upon receiving a response indicating completion of the session transfer, and after preparing the CS access network 110 for the handover 104, the server 112 (e.g., an MSS) sends a handover response, such as an SRVCC PS to CS response, to the telecommunications network device 102 (e.g., an MME). The telecommunications network device 102 then instructs the user equipment 106 to tune its radio to the CS access network 110 in order to connect to the CS access network 110 and continue the communication session. Upon receiving such instructions, the user equipment 106 carries them out, completing the handover 104.

A handover 104 can be initiated at any time during a voice call or other persistent communication session. As noted above, SIP (RFC 3261) can be used to establish and manage communication sessions.

To initiate a communication session, e.g., in response to a user's dialing a phone number, originating user equipment 106 sends a SIP INVITE request via access network 108 to terminating user equipment 116. This begins a "pre-alerting" phase of the session. The terminating user equipment 116 responds with a SIP response carrying a 180 response code, signifying "Ringing." This begins an "alerting" phase of the session, during which the terminating user equipment 116 provides an indication that a call is incoming Examples of indications include vibrations and audible ringtones. The SIP response is referred to as a "SIP 180 Ringing response", and likewise for other SIP response codes described herein. A SIP response code ending in "xx", e.g., a SIP 1xx Provisional response, signifies any response of, e.g., class 1 of SIP responses (RFC 3261, § 7.2).

When terminating user equipment 116 accepts the communication session (e.g., a user of device 116 chooses to answer the call), terminating user equipment 116 sends a SIP 200 OK response to originating user equipment 106. This begins an "established" phase of the communication session, during which data can be exchanged between originating user equipment 106 and terminating user equipment 116. In an example, the data includes digitized audio of a voice call. The alerting and pre-alerting phases are referred to collectively as a "pre-establishment phase." The pre-establishment phase corresponds to a SIP "early dialog state" and the established phase corresponds to a SIP "confirmed dialog state" (RFC 3261, § 12).

However, in some telecommunications networks, some telecommunications network devices or session continuity components support handovers during the pre-alerting phase and others do not. In an example, server 112, e.g., an MSS, supports pre-alerting handovers, but at least one of the session continuity components 114, e.g., ATCF 216 described below with reference to FIG. 2, does not support pre-alerting handovers. In another example, server 112 does not support pre-alerting handovers. As a result, pre-alerting handovers can terminate in dropped calls (or other prematurely terminated communication sessions) because one or more components involved in maintaining the communication session do not support pre-alerting handovers. Handovers can be triggered or required at any time during a communication session, including during the pre-alerting phase, e.g., due to declines in signal strength as user equipment 106, 116 moves. It is desirable to reduce the occurrence of call drops due to pre-alerting handovers.

Moreover, some geographical areas are served by multiple access networks and some geographical areas are served by only one access network. It is desirable to maintain communication sessions via access networks useful in the areas where user equipment (UE) 106, 116 are located.

Example Telecommunications Network

Figure 2:
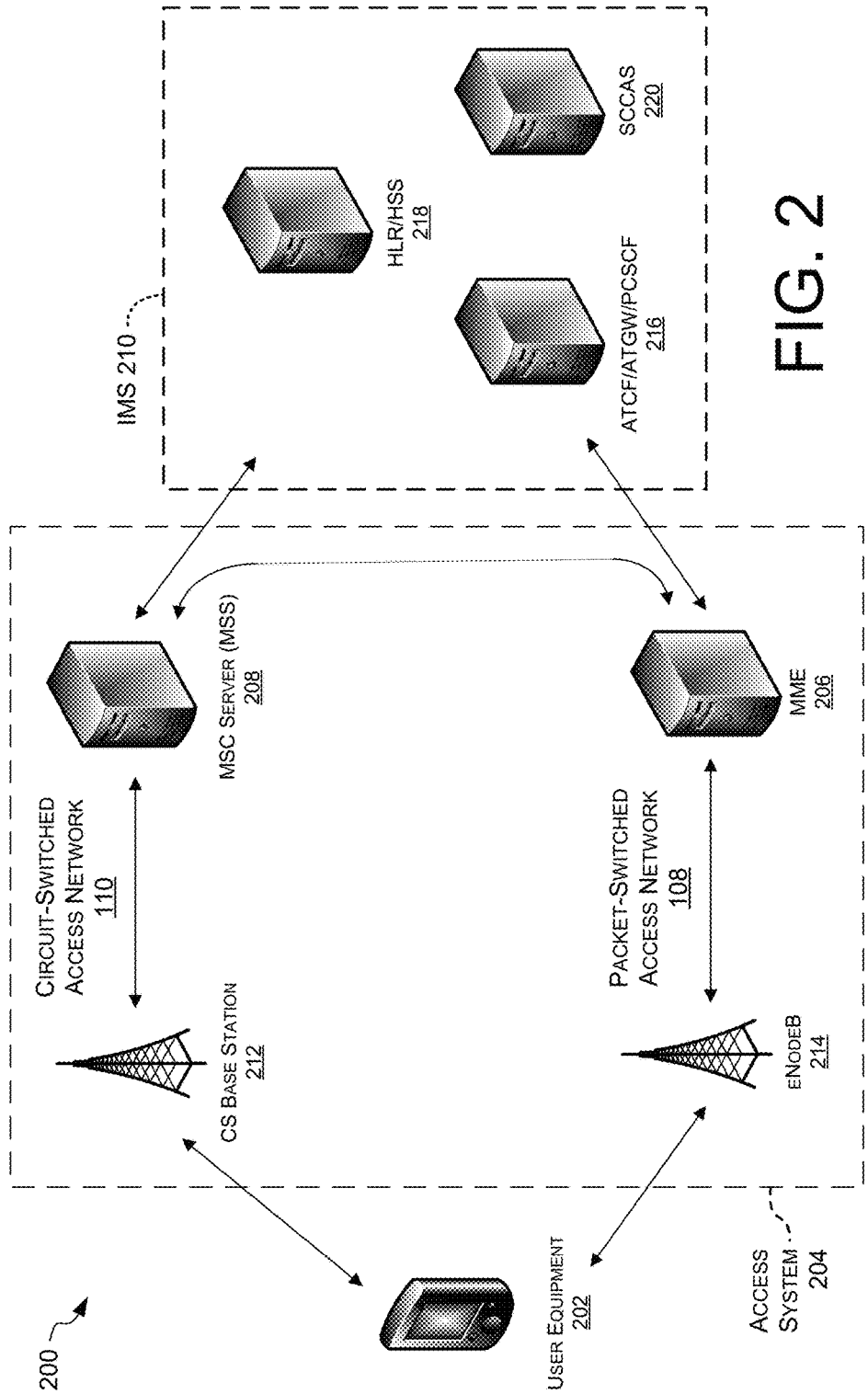
FIG. 2 illustrates an example telecommunications network, including components used to initiate a communication session and to re-initiate the communication session during handover of the communication session.

FIG. 2 illustrates an example telecommunications network 200. User equipment 202, which can represent user equipment 106 or 116, FIG. 1, communicates with access system 204 of the telecommunications network, including an MME 206 associated with a PS access network 108 and a MSS 208 associated with a CS access network 110. IMS 210 communicates with access system 204 and provides media-handling services, e.g., to route video or voice data and to provide a substantially consistent service to the users involved in a communication session even during handover of the communication session or when the communication session is cancelled and subsequently re-initiated. The CS access network 110 can include a CS base station 212 that provides connectivity to the CS access network. The MME 206 can enable connectivity to the telecommunications network through a PS access network 108, e.g., an LTE access network, which includes an eNodeB 214. The IMS 210 of the telecommunications network can include a number of nodes, such as an access transfer control function (ATCF)/access transfer gateway (ATGW)/proxy call session control function (PCSCF) 216, a home location register (HLR)/home subscriber server (HSS) 218, and a service centralization and continuity application server (SCCAS or "SCC AS") 220.

The telecommunications network can also include a number of devices or nodes not illustrated in FIG. 2. Such devices or nodes can include a visitor location register (VLR), a serving general packet radio service (GPRS) support node (SGSN), a gateway GPRS support node (GGSN), a policy control rules function (PCRF) node, a serving gateway (S-GW), a session border controller (SBC), or a media gateway. IMS 210 can further include a number of devices or nodes not illustrated in FIG. 2, such as a presence server, a telephony application server (TAS), and one or more call session control functions (CSCF). A core network of the telecommunications network can be a GPRS core network or an evolved packet core (EPC) network, or can include elements from both types of core networks. The telecommunications network can provide a variety of services to user equipment 202, such as synchronous communication routing across a public switched telephone network (PSTN). Further services can include call control, switching, authentication, billing, etc. In at least one example, IMS 210 functions and devices communicate using specific services provided by the access system 204 or elements thereof but are not directly tied to those specific services. For example, IMS 210 devices can intercommunicate using an EPC network, a GSM network, a SONET network, or an Ethernet network.

The devices and networks illustrated in FIG. 2 can be examples of the devices and networks illustrated in FIG. 1 and described above. For instance, the MME 206 can be a telecommunications network device 102, the user equipment 202 can be user equipment 106, the IMS 210 and its components 216-220 can be session continuity components 114, and the MSS 208 can be a server 112. Also, the eNodeB 214 can be an access point for the PS access network 108, and the CS base station 212 can be a base station for the CS access network 110. Accordingly, the descriptions of the devices and networks of FIG. 1 apply to the devices and networks of FIG. 2.

The devices and networks of FIG. 2 can cooperate to accomplish the handover 104 shown in FIG. 1 and described above. They can also cooperate to accomplish the initialization of a communication session of user equipment 202 and to provide a session transfer number (STN) identifying the IMS 210.

Figure 3:
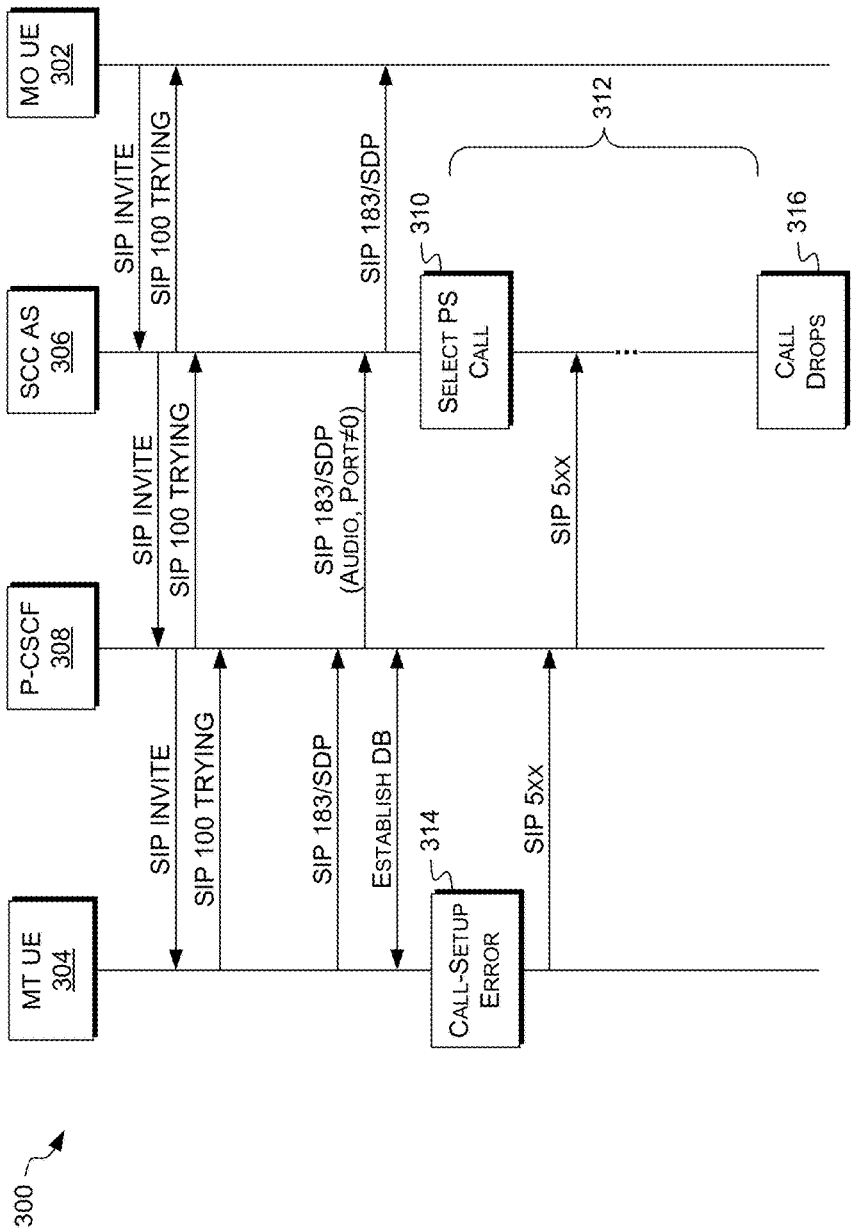
FIG. 3 shows an example call flow illustrating an example call-setup failure.

FIG. 3 shows an example call flow 300 illustrating an example call-establishment failure in prior systems. In FIG. 3 and other call flows herein, boxes across the top and vertical lines descending from those boxes represent user equipment 400, FIG. 4, or telecommunications network devices 500, FIG. 5 (collectively, "nodes"). Time increases down the page. Arrows between the vertical lines represent messages between nodes. Moreover, for this and other call flows herein, some components and messages are omitted for brevity. Call flows herein depict originating (calling-party) equipment towards the right and terminating (called-party) equipment towards the left, unless otherwise expressly indicated. In FIG. 3 and other call flows herein, "Req" stands for "request" and "Ack" stands for "acknowledgement." "Cmd" stands for "command." "Resp" stands for "response."

As discussed above, some telecommunications networks do not support SRVCC or CS retry during certain parts of the pre-establishment phase. In these networks, failures such as failure to set up a dedicated bearer to carry the data traffic can lead to a dropped call.

In the telecommunications network, user equipment 302 ("UE"; also referred to as a "user device") is an originating ("MO") UE. User equipment 302 originates a call to terminating ("MT") UE 304 by sending a SIP INVITE. The invite is transferred from UE 302 to UE 304, e.g., via an SCCAS 306 (e.g., a TAS) and a P-CSCF 308. Each device that receives the SIP INVITE responds to the sender with a SIP 100 Trying response.

In some examples, the communication session uses SIP preconditions (RFC 3312) to establish a communications link having a guaranteed quality of service (QoS). In some of these examples, MT UE 304 responds to the SIP INVITE with a SIP 183 Session in Progress response having an SDP payload describing the required QoS. Upon receipt of the SIP 183, e.g., having an SDP payload specifying a nonzero port to be used for transfer of, e.g., audio data, the SCCAS 306 selects PS operation for the communication session (block 310). The SCCAS 306 then starts a timer measuring a time period 312 during which the SCCAS 306 expects to receive a SIP 180 Ringing response.

In some examples, after sending the SIP 183, the MT UE 304 attempts to establish a dedicated bearer (DB) with the P-CSCF 308. However, DB establishment may be unsuccessful or call setup may otherwise fail (block 314). In response to call-setup failure, the MT UE 304 can transmit, e.g., a SIP 5xx or SIP 4xx failure message, e.g., a SIP 480 Temporarily Unavailable message. In some examples, the failure message can include a SIP 3xx Redirection response requiring further information or a retry to a different destination. Such responses can require a new, replacement communication session be established, even if the change of session is not presented to the user of UE 106 or 116. Telecommunications network devices, e.g., of an EPC, can also transmit failure messages. For example, a telecommunications network device can transmit a SIP 580 Precondition failure message if that device is not able to provide the required QoS. In some examples, a P-CSCF can send a failure message if the PCRF or EPC failed to set up a dedicated bearer. Such failures can be indicated by, e.g., a RAA message from a PGW indicating a resource allocation failure, or an ASR message from a PCRF indicating a termination cause of zero, one, or two.

In the illustrated example, the SCCAS 306 receives the failure message but, in some prior schemes, is not configured to respond to the failure message since the PS call has already been selected (block 310). In these schemes, the SCCAS 306 waits until time period 312 has expired. Since the MT UE 304 will not transmit a SIP 180 Ringing after the setup failure (block 314), the SCCAS 306 drops the call after time period 312 has expired (block 316). In some examples, the time period 312 may be, e.g., 32 s.

Example Devices

FIG. 4 illustrates a component level view of user equipment 400 capable of, e.g., connecting to a one or more access networks, of measuring those access networks, of providing measurement reports, of initiating, receiving, or engaging in a communication session, and of switching access networks during the communication session. The user equipment 400 can be any sort of user equipment, such as user equipment 106, 116, or 202. In various examples, the user equipment 400 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the user equipment 400 as being "mobile" (i.e., configured to be carried and moved around), it is to be appreciated that the user equipment 400 may represent various types of communication devices that are generally stationary as well, such as televisions, desktop computers, game consoles, set top boxes, and the like. In this sense, the terms "communication device," "wireless device," "wireline device," "mobile device," "computing device," and "user equipment (UE)" may be used interchangeably herein to describe any communication device capable of performing the techniques described herein. Examples of such devices include embedded computing systems in vehicles or shipping containers that communicate via a wireless network, e.g., to report position or other information to a monitoring service. Furthermore, the user equipment 400 may additionally be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, and/or any future IP-based network technology or evolution of an existing IP-based network technology. The user equipment 400 can communicate via any of these types of wireless networks concurrently, e.g., a smartphone concurrently maintaining connections to WIFI and LTE networks, or successively, e.g., a UE handing over from a PS access network to a CS access network, e.g., as described above with reference to FIGS. 1 and 2.

As illustrated, the user equipment 400 comprises a system memory 402 storing communication client(s) 404, call-setup module 406, SIP module 408, and radio resource control 410. The user equipment 400 includes processor(s) 412, radio 414, and one or more antenna(s) 416 connected to radio 414. The user equipment 400 can also include one or more of a removable storage 418 (e.g., magnetic disks, optical disks, or tape), a non-removable storage 420 (e.g., hard drives), a display 422, output device(s) 424, or input device(s) 426. Processor 412, radio 414, system memory 402, and other illustrated components of user equipment 400 can be communicatively coupled via bus 428, e.g., a PCI or other computer bus. As indicated, communication client(s) 404, call-setup module 406, SIP module 408, and radio resource control 410 can intercommunicate when executed by processor(s) 412 to carry out acts described below.

In various embodiments, system memory 402 is volatile (such as RAM), non-volatile (such as ROM, flash memory, etc.), or some combination of the two. The communication client(s) 404 stored in the system memory 402 can enable the user equipment 400 to establish and carry on communication sessions. The communication client(s) 404 can include voice call handlers, video calling clients, gaming and media clients, etc. The communication client(s) 404 can utilize a policy, preferences, etc. in determining which of a number of available access networks the communication client(s) 404 should use in initiating communication sessions. For example, the communication client(s) 404 can utilize a policy or preference that prefers LTE access networks to GSM access networks, and GSM access networks to other CS access networks.

The call-setup module 406 can perform a number of functions, such as interfacing with the radio 414 through the radio resource control 410, preparing the user equipment 400 to receive or handover a call, tuning the radio 414, receiving and processing an invitation message such as a SIP INVITE received via the radio 414, transmitting a preconditions message such as a SIP 183/SDP response via the radio 414, detecting a failure condition such as failure to establish a dedicated bearer, or transmitting an error code indicative of the failure condition via the radio 414. Further details of functions that can be performed by call-setup module 406 are discussed below with reference to FIGS. 6-11.

The SIP module 408 can participate with the communication client(s) 404 in initiating a communication session by, for example, formulating a SIP REGISTER or INVITE request and sending the request to the telecommunications network.

The radio resource control 410 can, for example, tune the radio 414 and communicate using the radio 414. In some examples, tuning can include adjusting parameters of the baseband, modulator, demodulator, or other components of the radio 414. Tuning can include adjusting frequencies of oscillators in the radio 414 or changing the routing of packets in processor(s) 412 or other components of the user equipment 400.

In some embodiments, the processor(s) 412 is a central processing unit (CPU), a graphics processing unit (GPU), or both CPU and GPU, or any other sort of processing unit. Example processing units include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and processors incorporating more than one type of device (e.g., a CPU and an FPGA on a single die).

System memory 402, removable storage 418 and non-removable storage 420 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the user equipment 400. Any such tangible computer-readable media can be part of the user equipment 400. Tangible computer-readable media can include volatile and nonvolatile, removable and non-removable media implemented in any method or technology for storage of information, such as computer readable instructions, data structures, program modules, or other data.

In some embodiments, the radio 414 includes any sort of radio known in the art. For example, radio 414 can be a radio transceiver that performs the function of transmitting and receiving radio frequency communications. The radio interface can facilitate wireless connectivity between the user equipment 400 and various cell towers, base stations and/or access points of access networks, e.g., PS or CS networks.

In various embodiments, the display 422 is a liquid crystal display, organic light-emitting diode (OLED) display, or any other type of display commonly used in telecommunications devices. For example, display 422 can be a touch-sensitive display screen, and can then also act as an input device or keypad, such as for providing a soft-key keyboard, navigation buttons, or the like.

In some embodiments, the output devices 424 include any sort of output devices known in the art, such as a display (already described as display 422), speakers, a vibrating mechanism, or a tactile feedback mechanism. Output devices 424 also include ports for one or more peripheral devices, such as headphones, peripheral speakers, or a peripheral display.

In various embodiments, input devices 426 include any sort of input devices known in the art. For example, input devices 426 can include a camera, a microphone, a keyboard/keypad, or a touch-sensitive display (such as the touch-sensitive display screen described above). A keyboard/keypad can be a push button numeric dialing pad (such as on a typical telecommunications device), a multi-key keyboard (such as a conventional QWERTY keyboard), or one or more other types of keys or buttons, and can also include a joystick-like controller and/or designated navigation buttons, or the like.

FIG. 5 illustrates a component level view of a telecommunications network device 500, e.g., a core network device, capable of initiating and managing setup and handover of a communication session of user equipment, e.g., via a PS access network 108 or a CS access network 110. The telecommunications network device 500 can be or include, e.g., telecommunications network device 102, MSS 208, MME 206, or SCCAS 220. As illustrated, the telecommunications network device 500 comprises a system memory 502 storing a call-setup module 504, action-related data 506, and a SIP module 508. Also, the telecommunications network device 500 includes processor(s) 510 and can include at least some of a removable storage 512, a non-removable storage 514, transceivers 516, output device(s) 518, and input device(s) 520, any or all of which can be communicatively connected via bus 522. As indicated, call-setup module 504 and SIP module 508 can intercommunicate, and can access action-related data 506, when executed by processor(s) 510 to carry out acts described below The call-setup module 504 stored in the system memory 502 can perform a number of functions, including receiving session-progress information of a communication session with the user equipment, e.g., a SIP 183/SDP response to a SIP INVITE, receiving a session-failure indication such as a SIP 503 response, determining action data based at least in part on the received session-failure indication, in response to the action data indicating a retry, re-initiating the communication session via an access network indicated in the action data, initiating a handover of a communication session based on measurement reports, selecting a CS access network for the handover, providing a handover request to a server associated with the CS access network, either directly or through an MME, receiving a handover response, and instructing the user equipment to connect to the CS access network to complete the handover. The call-setup module 504 can also provide measurement gap instructions to user equipment and instruct the user equipment to prepare for a handover. Further details of functions that can be performed by call-setup module 504 are discussed below with reference to FIGS. 6-10.

The action-related data 506 can include tables of action codes specific to particular session-failure indications or cells, e.g., as discussed below with reference to FIG. 6. The action-related data 506 or other data in system memory 502, can include information useful for call handovers or other re-initiations of communication sessions. Such information can include mappings of CS access networks to servers, such as MSSs, and mappings of proxy call session control functions (P-CSCFs) to ATCFs and STN-SRs.

The SIP module 508 can enable user equipment to perform a SIP registration for a communication session with an IMS or other session continuity components.

In some embodiments, the processor(s) 510 is a central processing unit (CPU), a graphics processing unit (GPU), or both CPU and GPU, or any other sort of processing unit described above with reference to processor 412. System memory 502, removable storage 512 and non-removable storage 514 are all examples of computer-readable storage media, e.g., as discussed above with reference to FIG. 4. In some embodiments, the output devices 518 can include components described above with reference to the output devices 424. In various embodiments, input devices 520 can include components described above with reference to the input devices 426.

In some embodiments, the transceivers 516 include any sort of transceivers known in the art. For example, transceivers 516 can include a radio transceiver that performs the function of transmitting and receiving radio frequency communications. Also, or instead, the transceivers 516 can include other wireless or wired connectors, such as Ethernet connectors or near-field antennas. The transceivers 516 can facilitate connectivity between devices of a telecommunications network or between a public network, such as PS access network 108, and one or more other devices of a telecommunications network.

Example Processes

Figure 6:
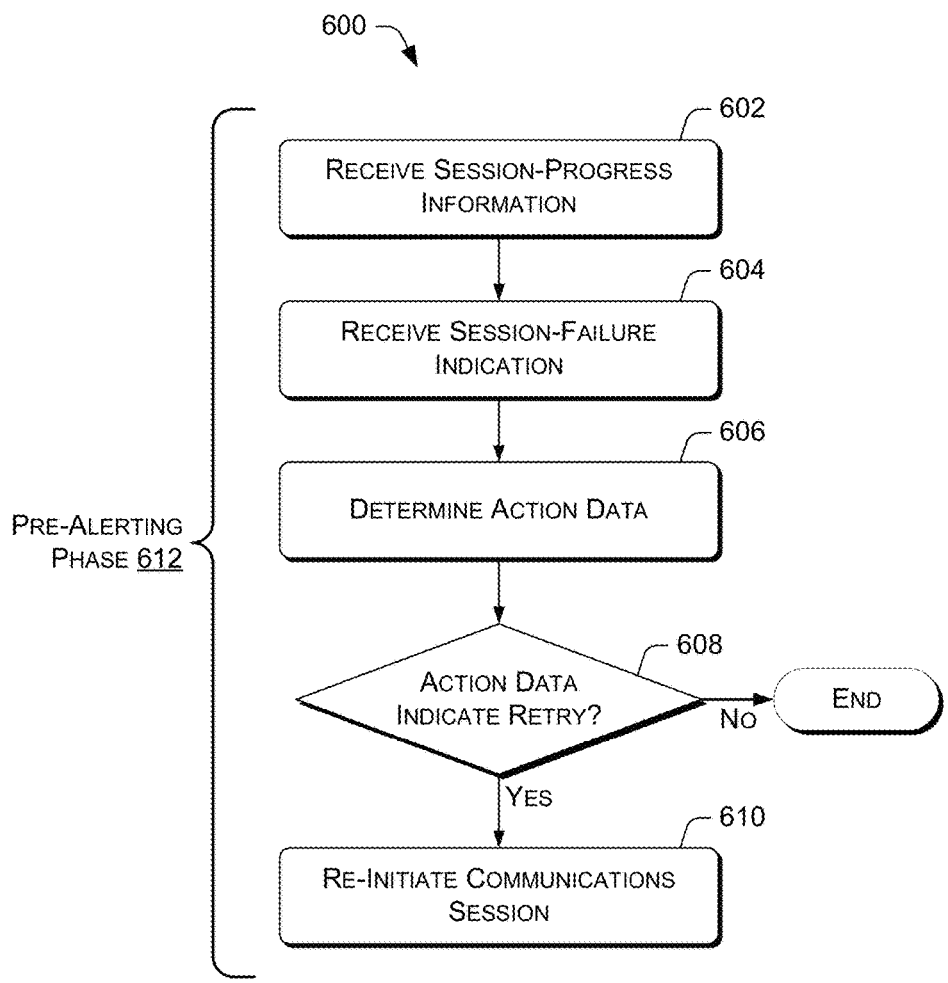
FIG. 6 illustrates an example process performed by, e.g., a core network device in a telecommunications network for establishing a communication session.
Figure 7:
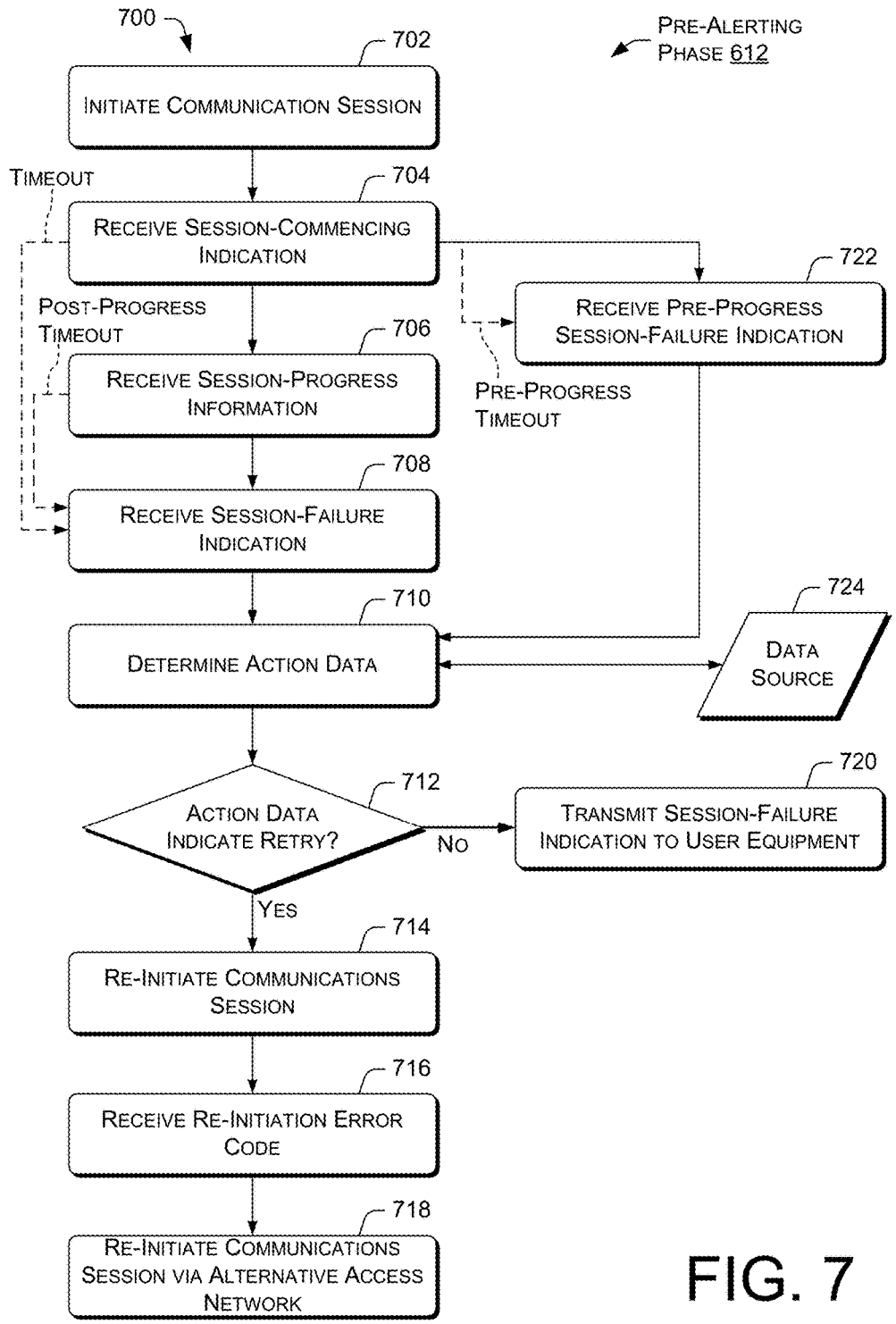
FIG. 7 illustrates an example process performed by, e.g., a core network device in a telecommunications network for establishing a communication session.
Figure 8:
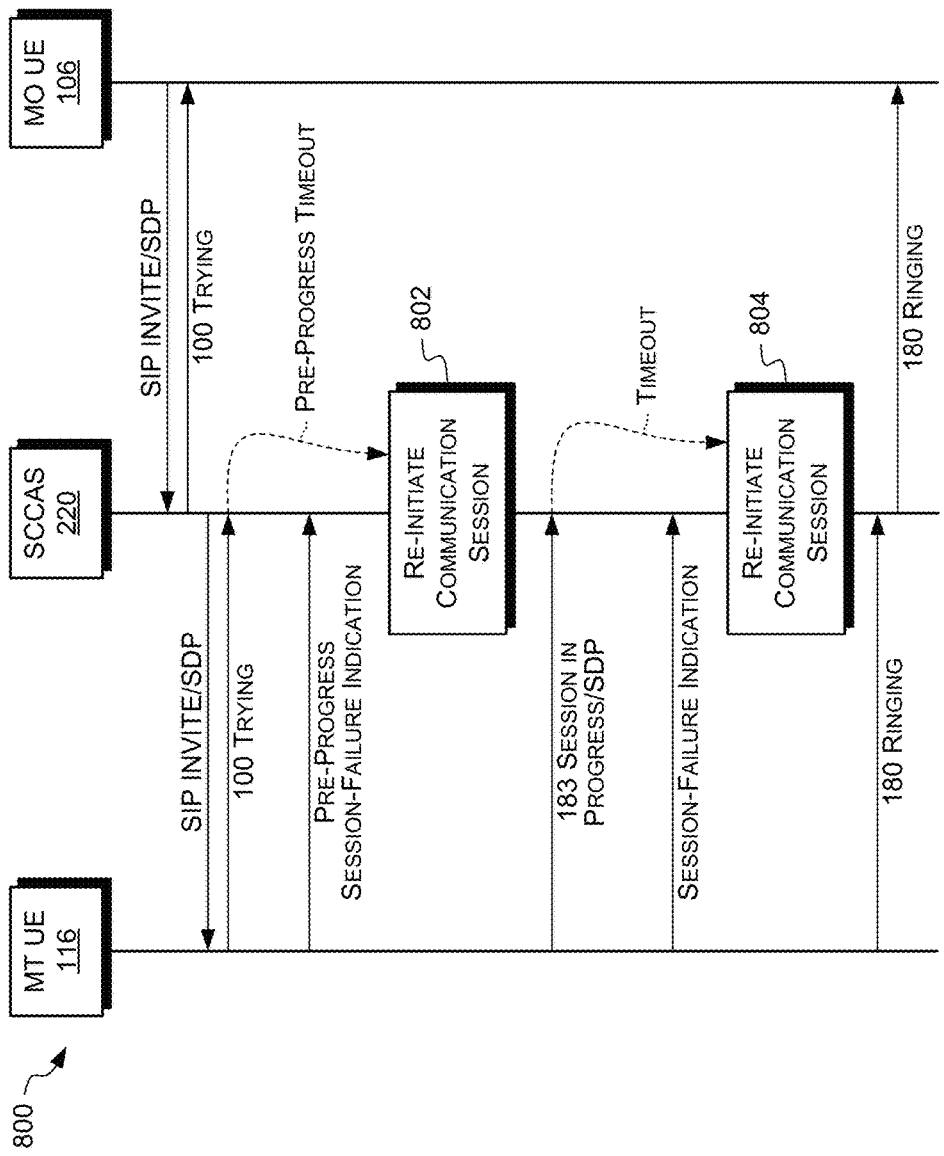
FIG. 8 is a call flow showing an example of processes for establishing a communication session.
Figure 9:
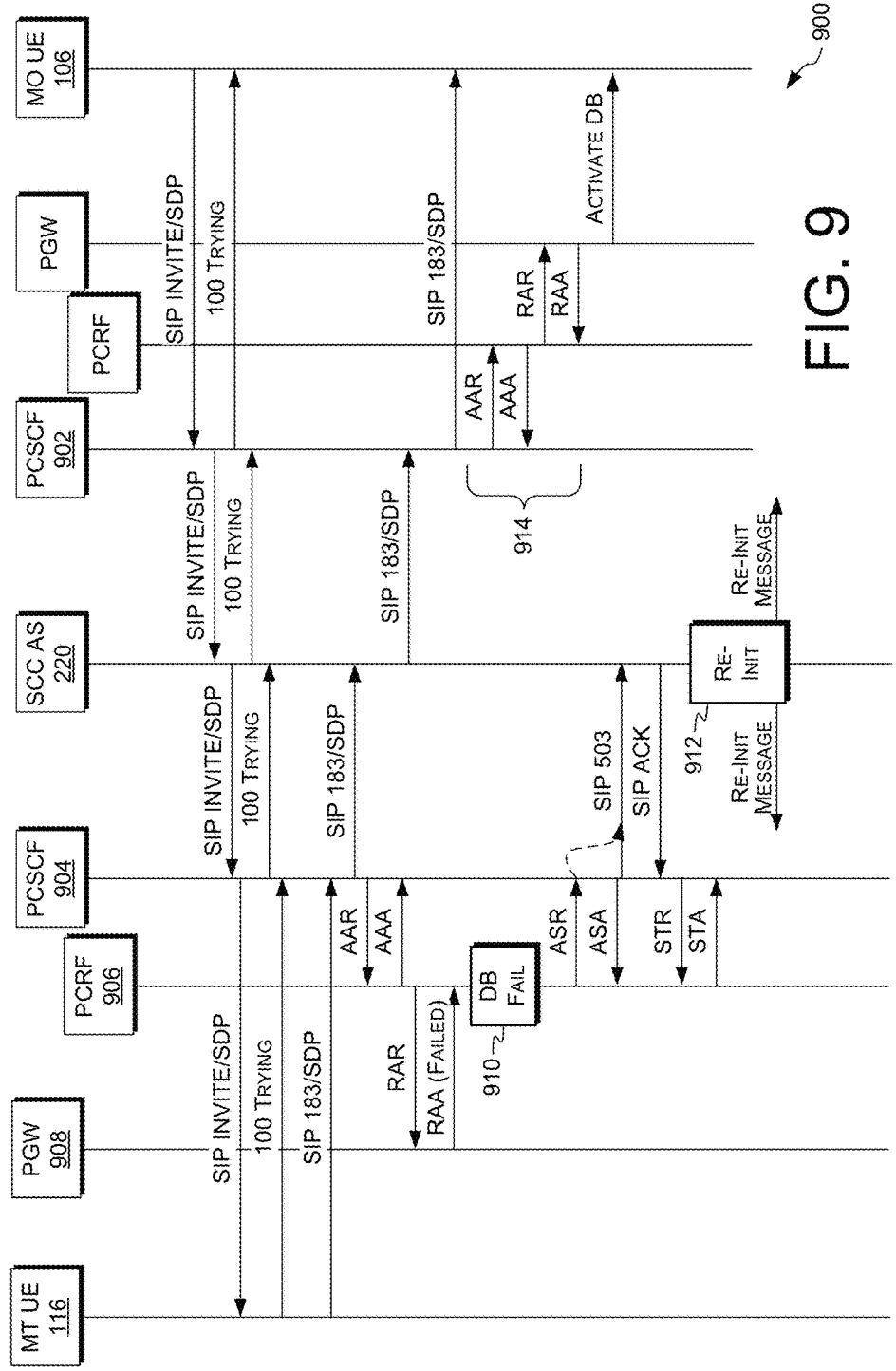
FIG. 9 is a call flow showing an example of processes for establishing a communication session.
Figure 10:
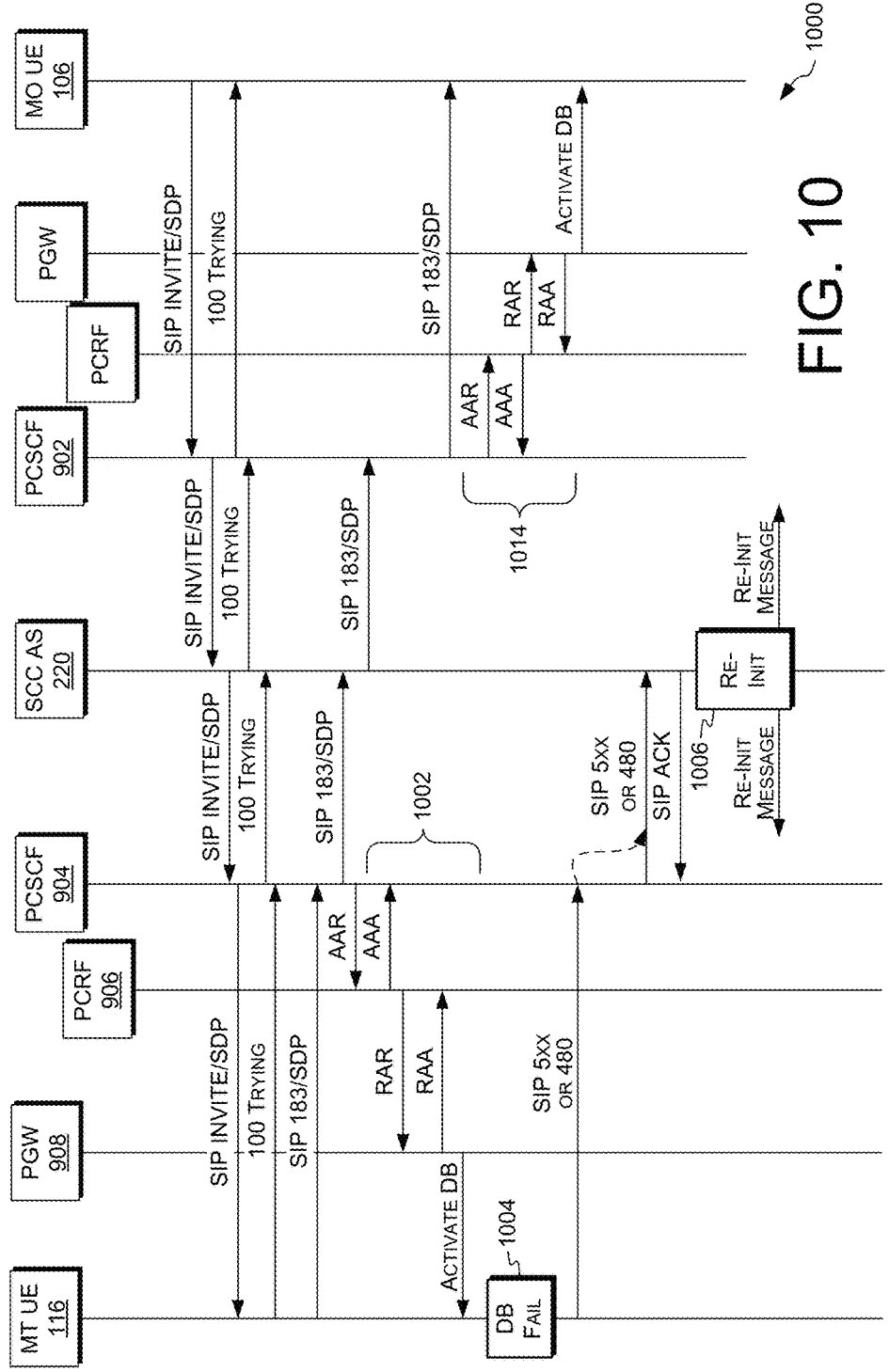
FIG. 10 is a call flow showing an example of processes for establishing a communication session.
Figure 11:
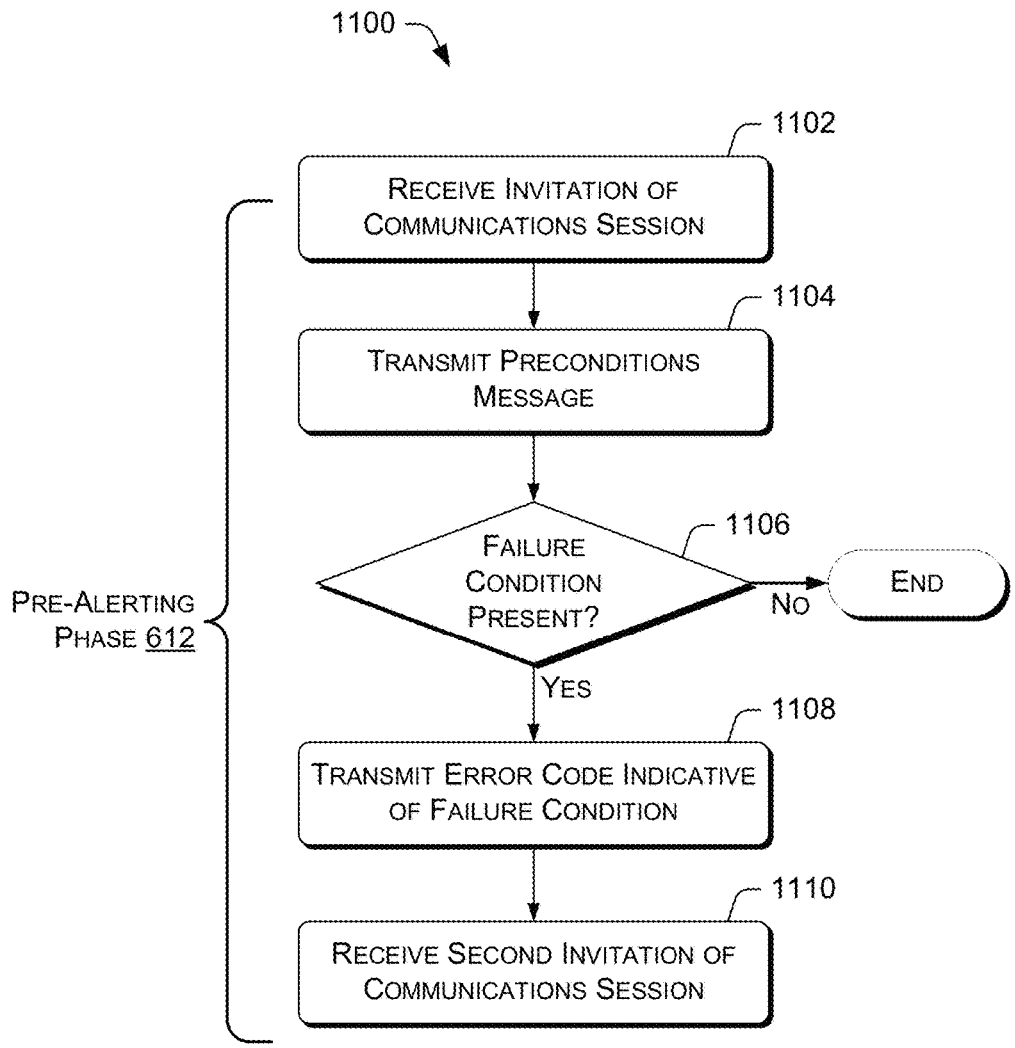
FIG. 11 illustrates an example process for establishing a communication session performed, e.g., by user equipment communicatively connectable with a telecommunications network.

FIGS. 6, 7, and 11 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, except where expressly indicated, and any number of the described operations can be combined in any order and/or in parallel to implement the processes. Similarly, the order of data exchanges shown in example call flows of FIGS. 8, 9, and 10 is not intended to be construed as a limitation, except where expressly indicated.

FIG. 6 illustrates an example process 600 for initiating a communication session, the process performed by a core network device in a telecommunications network. The core network device can be communicatively connectable with user equipment, e.g., terminating user equipment 116 of a communication session. Initiating a communication session as described herein can provide the user of the user equipment with the perception of a substantially uninterrupted communication session even in the presence of errors, e.g., errors requiring handovers during the pre-alerting phase. In some examples, the core network device includes a telephony application server (TAS) or a service centralization and continuity application server (SCCAS) 220.

The process includes, at 602, receiving session-progress information of a communication session with the user equipment. The session-progress information can include, e.g., a SIP 183/SDP message or other message indicating preconditions or other requirements of the communication session. In an example, the SDP payload of the SIP 183 response indicates a required QoS, e.g., required consistent bandwidth, that the telecommunications network is required to provide in order to support the communication session. In an example, the session-progress information includes a non-invite SIP transaction.

At 604, subsequent to 602, the core network device receives a session-failure indication. The session-failure indication can include, e.g., a SIP 4xx or 5xx response such as a SIP 480 or 503. The session-failure indication can be provided, e.g., by UE 116 or by P-CSCF 216, FIG. 2. Example events triggering session-failure indications are discussed below with reference to FIG. 7.

At 606, the core network device determines action data based at least in part on the received session-failure indication. In some examples, the core network device determines the action data by retrieving the action data from a data source keyed by at least the received session-failure indication, an access-network type of the communication session, or a unique identifier of a radio carrying the communication session such as an enhanced cell global identifier (ECGI). For example, the core network device can look up the session-failure indication, e.g., the SIP response code, in a lookup table (LUT) of actions. The LUT or other tables or information used by the core network device in determining the action data can be stored in action-related data 506, FIG. 5.

In some examples, at least part of the session-failure indication, e.g., a SIP numeric error code, indicates or corresponds to the nature or severity of a failure. In some examples, a SIP 500 error code indicates a network failure and a SIP 503 error code indicates a user equipment failure. In some examples, user equipment such as UE 116 provides several different error codes or other values for respective, different types of failures. For example, UE 116 can provide different error codes for hardware failures, authentication failures, and insufficient signal strength. In some examples, UE 116 provides different error codes depending on detected properties of access networks 108, 110 at UE 116. For example, UE 116 can provide a different error code when CS retry is available than when CS retry is not available, e.g., due to low signal strength of a CS access network 110.

In some examples, at least part of the session-failure indication indicates whether or not the failure will likely be resolved with a few seconds. For example, failures due to network capacity being exceeded may be resolved as users terminate communication sessions. However, failures due to a fatal hardware failure in a core network device may not be resolved for hours or days, until a maintenance technician can repair or replace the failed device.

In some examples, the core network device is responsive to at least part of the session-failure indication, e.g., one or more predetermined SIP numeric error codes listed in a data source, to re-initiate a communication session without waiting for any pending timeout periods to expire. The data source can be programmed, e.g., by the operator of the telecommunications network, to include data of parts of the session-failure indication and corresponding action data. The data source can include a fixed table stored, e.g., in a nonvolatile memory, or can include an updateable table that can be altered at runtime. Runtime alteration of the data source can permit adapting to user equipment that behaves differently from the behaviors reflected in the data source.

In some examples, the data source can specify action data based on a hierarchical or wildcard organization of keys. In some examples, the data source includes action data for a SIP 480 response and separate action data for any other SIP 4xx response.

At 608, the core network device determines whether the action data indicate a retry. If so, the next block is block 610. If not, the process can terminate.

At 610, in response to the action data indicating a retry, the core network device re-initiates the communication session via an access network indicated in the action data. For example, the action data can indicate that the communication session should be re-initiated via the first access network, a second access network of the same type, or a second access network of a different type. In some examples, the core network device can transmit a CS page to re-initiate the communication session via a CS access network 110. Further examples are discussed below with reference to block 714, FIG. 7. Re-initiating the communication session can include conducting a handover such as discussed above with reference to FIGS. 1 and 2.

In the example shown, block 602, 604, 606, 608, and 610 take place during a pre-alerting phase 612 preceding or terminated by an alerting-progress message, e.g., a SIP 180 Ringing response. Pre-alerting phase 612 can follow or commence with receipt of an invitation message, e.g., a SIP INVITE.

FIG. 7 illustrates an example process 700 for initiating a communication session, the process performed by a core network device in a telecommunications network. Operations shown in FIG. 7 can be performed, e.g., during pre-alerting phase 612.

At 702, the core network device initiates a communication session with the user equipment. In some examples, the core network device forwards to terminating UE 116 a SIP INVITE received from an originating UE 106 or another SIP proxy forwarding such an INVITE.

At 704, the core network device receives a session-commencing indication, e.g., a SIP INVITE or a SIP 100 Trying response. The core network device sets a timer or otherwise provides for a future indication of the expiration of a timeout period defined with reference to a time of receipt of the session-commencing indication.

At 706, the core network device receives session-progress information, e.g., as described above with reference to block 602.

At 708, the core network device receives a session-failure indication, e.g., as described above with reference to block 604. In some examples, the core network device, e.g., a timer therein, provides the session-failure indication in response to expiration of the timeout period defined with reference to a time of receipt of the session-commencing indication. This is graphically indicated by the dashed "Timeout" arrow. The timeout period can expire before or after receipt of the session-progress information (block 706).

In some examples, the core network device is further configured to provide the session-failure indication in response to expiration of a timeout period defined with reference to a time of receipt of the session-progress information. This is graphically indicated by the dashed "Post-Progress Timeout" arrow.

In some examples, the telecommunications network includes a call session control function (CSCF) server, e.g., a P-CSCF, communicatively connected with the core network device. In some examples, the CSCF is configured to provide the session-failure indication in response to a failure to set up a dedicated bearer channel for the user equipment. Examples are discussed below with reference to FIGS. 9 and 10.

At 710, the core network device determines action data, e.g., as described above with reference to block 606.

At 712, the core network device determines whether the action data indicate a retry, e.g., as described above with reference to block 608. If so, the next block is block 714. If not, the next block can be block 720.

At 714, the core network device re-initiates the communication session, e.g., as described above with reference to block 610.

In some examples, the telecommunications network includes a first access network of a first type, e.g., a PS access network 108, and a second access network of a second, different type, e.g., a CS access network 110. In some of these examples, the core network device initiates the communication session (block 702) via the first access network 108. In response to a selected error code in the received session-failure indication, the core network device, at block 710, provides the action data including an indication of the second access network 110. In response, at block 714, the core network device can conduct an SRVCC PS-to-CS handover ("CS fallback," "CSFB," or "CS retry"). This can provide continuity of the communication session, e.g., as a user carries UE 116 out of range of the first access network 108.

In some examples, the telecommunications network includes a first access network of a first type, e.g., PS or CS. In some of these examples, the core network device initiates the communication session (block 702) via the first access network. In response to a selected error code in the received session-failure indication, the core network device, at block 710, provides the action data including an indication of the first access network. In response, at block 714, the core network device can re-initiate the communication session on the same access network. This can provide continuity of the communication session, e.g., when UE 116 passes through a brief null in signal coverage of the first access network. Such nulls can be, for example, deep multipath fades introduced in an urban-canyon or indoor environment.

In some examples, the telecommunications network further includes a first access network of a first type and a second access network of a second, different type. In some of these examples, the core network device initiates the communication session via the first access network (block 702). In response to a selected error code in the received session-failure indication, the core network device provides the action data further including an indication of a relative order of the first access network and the second access network (block 710). For example, the core network device can provide the action data indicating that the first access network is first and the second access network is second, or vice versa. The core network device can then carry out the re-initiating (block 714) via the access network indicated first in the relative order in the action data.

In some of these examples, at 716, the core network device receives a selected re-initiation error code, In some of these examples, at 718, the core network device re-initiates the communication session via the access network indicated second in the relative order in the action data. This can be done in response to receipt of the selected re-initiation error code.

Some examples using action data indicating a relative order can provide continuity of a communication session using an access network selected by the operator of the telecommunications network according to the location of UE 116. For example, in some areas, PS access network 108 can have a stronger signal than CS access network 110. On such networks, the core network device can attempt multiple times to use PS access network 108, and fall back to CS access network 110 if necessary. In some examples, the action data can specify any number of access networks and any number of retry attempts for individual ones of the access networks.

At 720, in some examples, the action data indicate no retry. In response to such an indication, the core network device in these examples transmits a session-failure indication to the user equipment. For example, the core network device can transmit a SIP CANCEL downstream to the terminating UE 116. Block 720 can also include transmitting an upstream session-failure indication, e.g., a SIP 487 or 488 response, towards originating UE 106.

In some examples, the core network device additionally or alternatively responds to session-failure indications received before the session-progress information. In some examples, block 702 can be followed by block 722.

At 722, in some examples, before receiving the session-progress information (block 706), the core network device receives a pre-progress session-failure indication. The pre-progress session-failure indication can include, e.g., a SIP 5xx error code or other indication discussed above with reference to block 708.

In some examples using block 722, the core network device, e.g., a timer therein discussed above with reference to block 704, provides the session-failure indication in response to expiration of the timeout period defined with reference to a time of receipt of the session-commencing indication. This is graphically indicated by the dashed "Pre-Progress Timeout" arrow. The timeout period can expire before or after receipt of the session-progress information (block 706).

In some examples using block 722, block 710 includes determining pre-progress action data based at least in part on the received session-failure indication. For example, the core network device can determine the pre-progress action data by, e.g., retrieving the pre-progress action data from a data source 724, e.g., a LUT or database, keyed by at least the received pre-progress session-failure indication, an access-network type of the communication session, or a unique identifier of a radio carrying the communication session (e.g., an ECGI). The data source 724 can be the same data source used to look up action data as discussed above with reference to block 710, or can be a different data source. The data source 724 can be additionally or alternatively indexed by a bit indicating whether the lookup is of a session-failure indication or a pre-progress session failure indication.

In some examples, using block 722, decision block 712 includes determining whether the pre-progress action data indicate a retry. In some of these examples, block 714 includes, in response to the pre-progress action data indicating a retry, re-initiating the communication session via an access network indicated in the pre-progress action data.

Table 1, below, shows example records that can be stored in a data source including action data. Examples of such data sources include those discussed above with reference to block 606, FIG. 6, block 710, and block 722, and the data source 724. Table 1 does not necessarily represent any particular data source or combination of records to be used together. The "Keys" columns contain values that can be used to select particular action data, e.g., keys for database lookups such as SQL SELECT statements. The "Result" column contains, in each row, action data values corresponding to the keys in that row.

TABLE 1

Keys

| Access Type | Access Network Information | Failure Indication | Result Action Data | Row |
|---|---|---|---|---|
| PS | 3102602b* | SIP 503 | CS only | 1 |
| PS | 3102602b* | SIP 503 | PS only | 2 |
| PS | 3102602b* | SIP 480 | PS preferred | 3 |
| PS | 3102602b* | SIP 4* | CS only | 4 |
| PS | 3102602c34138e602 | * | PS only | 5 |
| PS | 3102602c341* | * | PS preferred | 6 |
| * | 310260* | * | PS preferred | 7 |
| * | 310* | * | No retry | 8 |
| PS | 3102601c* | SIP 503 | PS only | 9 |
| PS | 3102603c* | SIP 503 | CS only | 10 |
| PS | 3102605c* | SIP 5* | CS preferred | 11 |
| PS | 3102606c34* | SIP 5* | No retry | 12 |
| PS | 3102606c34* | SIP 4* | No retry | 13 |
| CS | 31026a16c21* | SIP 4* | PS only | 14 |
| CS | 310260a1b* | SIP 4* | No retry | 15 |

In Table 1, "Access Type" indicates whether UE 116 is connected via a PS or CS access network when the failure occurs. For example, PS connections can be made via an Evolved Universal Terrestrial Radio Access Network (EU-TRAN). In Table 1, "Access Network Information" includes a whole or partial ECGI. The asterisk ("*") is a wildcard indicating that one or more characters (e.g., digits or symbols) may follow. For example, a table row listing Access Network Information of "310260*" can apply to any ECGI in Mobile Country Code (MCC) 310 (the USA) on Mobile Network Code (MNC) 260. In some examples, the Access Type and Access Network Information for a communication session can be retrieved from or determined based at least in part on, e.g., a P-Access-Network-Info header in a SIP INVITE or REGISTER or a response to one of those, e.g., a SIP 183 response or SDP payload therein. Example access networks include LTE, WIFI (IEEE 802.11), GSM EDGE Radio Access Network (GERAN), UMTS Terrestrial Radio Access Network (UTRAN), and other cellular access networks.

In Table 1, "Failure Indication" indicates the relevant part of the failure indication. For example, "SIP 4*" refers to any SIP 4xx response. The Failure Indication for a row can include, e.g., a SIP 3xx, 4xx, 5xx or 6xx response code. In Table 1, "Action Data" represents the action data the core network device retrieves from the appropriate row of Table 1. In Table 1, "Row" is a row number used in the following discussion. The core network device can use various techniques for selecting rows from Table 1 when more than one row matches. For example, the core network device can select the most specific row (e.g., the row with the longest match) or the row listed first or last in a predetermined order of the rows.

In some examples, exactly one of rows 1 and 2 can be included in the data source to specify the desired re-initiation access network in response to SIP 503 errors in any cells in tracking areas 2b000-2bfff of MCC 310, MNC 260. In some examples, the first two digits of the tracking-area number can indicate the band plan, e.g., band class 12 or band class 17. In some examples, rows 3 and 4 can be used together to cause the core network device to re-initiate the communication session via a PS or (if PS fails) CS access network in case of a SIP 480 error and via a CS access network in case of any other SIP 4xx error. In some examples, rows 5 and 6 can be used together to cause the core network device to re-initiate the communication session via a PS access network in cell 38e602 in tracking area 2c341, and to re-initiate via either a PS or (if PS fails) a CS access network in any other cell in tracking area 2c341. In some examples, row 7 can be included to provide that, failing more specific instructions, the core network device should re-initiate via a PS access network if possible, or else via a CS access network. In some examples, row 8 can be included with row 7 to provide that sessions should not be re-initiated when roaming outside MNC 260.

Rows 9 and 10 show examples of differentiating the type of access network based on tracking area. Row 11 shows an example of action data directing the core network device to re-initiate via a CS access network and, if that fails, via a PS access network. Rows 12 and 13 show examples of action data that does not indicate a retry or re-initiation. For the conditions listed in rows 12 and 13, the core network device can transmit a session-failure indication (block 720, FIG. 7). In some examples, the data source can be updated to indicate "No retry," e.g., during temporary periods of network overload, and then set to another retry option. In some examples, the data source can be updated to indicate "No retry," e.g., for roaming networks (e.g., row 8). In some examples, the data source can be updated to indicate "No retry," e.g., for edge cells, e.g., without surrounding coverage.

In some examples, action data can be determined for calls on which the MT UE is connected via a CS access network. Rows 14 and 15 in Table 1 show some examples. Row 14 indicates that retry should only be attempted via a PS network, e.g., for areas at the fringe of CS network coverage but in which band class 12 LTE-only coverage is strong. Row 15 indicates that retry should not be attempted, e.g., for areas at the fringe of CS network coverage and without LTE coverage.

Various examples can be used with IMS centralized services provided to UEs connected via second-generation (2G) access networks, such as GSM, or third-generation (3G) access networks, such as UMTS. In some such examples, the MSS or MGCF serving a 2G or 3G subscriber acts as a PCSCF and registers the UE to the IMS core. Calls from that subscriber are routed over the IMS core, with the MSC acting as a PCSCF. Thus legacy subscribers migrated. Some examples of IMS centralized services do not require changes to the UE, but use the IMS core rather than an existing 2G or 3G core network, e.g., the GSM network switching subsystem. In some of these examples, the SCCAS stores data of whether a UE is connected via a CS 2G, CS 3G or PS LTE access network. Action data can indicate appropriate retry conditions for the UEs access network and coverage. For example, if CS 2G paging to an MT UE fails, the UE may be reachable via IMS over a 3G or LTE access network. In some examples of centralized services, the MSS can be communicatively connected with the SCSCF and SCCAS.

In the Action Data in Table 1, "CS only" means that the core network device should only attempt to retry (i.e., re-initiate the communication session) via CS access network 110. "PS only" means that the core network device should only attempt to retry via PS access network 108. "CS preferred" means that the core network device should attempt to retry via CS access network 110 (block 714). If that retry fails (block 716), the core network device should attempt to retry via PS access network 108. That is, in this example, CS comes first in the relative order in the action data and PS comes second in the relative order. "PS preferred" is as "CS preferred," but with PS first in the relative order and CS second in the relative order. "No retry" means that re-initiation should not be performed (block 720).

FIG. 8 is a call flow 800 showing an example of processes shown in FIGS. 6 and 7. Call flow 800 shows some exchanges of messages between originating (MO) UE 106, SCCAS 220 (which can represent another core network device or a combination of core network devices, e.g., a TAS or TAS/SCCAS), and terminating (MT) UE 116.

In the example shown, MO UE 106 initiates the communication session by transmitting a SIP INVITE to MT UE 116 via, e.g., SCCAS 220. Other components can be involved, e.g., access networks 108 or 110; these components are omitted for brevity. SCCAS 220 receives the SIP INVITE from MO UE 106, responds to MO UE 106 with a SIP 100 Trying response, and forward the SIP INVITE to MT UE 116. MT UE 116 then responds to SCCAS 220 with a SIP 100 Trying response.

The session can fail, e.g., due to hardware failures or other events. In some examples, MT UE 116 transmits a pre-progress session-failure indication to SCCAS 220. In some examples, SCCAS 220 determines that a timeout period defined with reference to a time of receipt of the session-commencing indication has expired without receiving session-progress information. This is graphically represented by the "Pre-Progress Timeout" arrow. At 802, in response to failure of the communication session, the SCCAS 220 can re-initiate the communication session.

In some examples, setup of the communication session proceeds to, e.g., a QoS phase or other setup phase involving session-progress information. In the example shown, MT UE 116 sends session-progress information, e.g., a SIP 183 Session in Progress message with an SDP payload, to SCCAS 220.

The session can fail after transmission of the session-progress information, e.g., due to failure to setup a dedicated bearer or inability to allocate required bandwidth to meet QoS requirements. In some examples, MT UE 116 transmits a session-failure indication to SCCAS 220. In some examples, SCCAS 220 determines that a timeout period defined with reference to a time of receipt of the session-progress information has expired without receiving an alerting-progress message, e.g., a SIP 180 Ringing response. This is graphically represented by the "Pre-Progress Timeout" arrow. At 804, in response to failure of the communication session, the SCCAS 220 can re-initiate the communication session.

In response to successful completion of the pre-alerting phase, MT UE 116 can transmit a SIP 180 Ringing response or other alerting-progress message to MO UE 106 via SCCAS 220, as shown.

FIG. 9 is a call flow 900 showing an example of processes shown in FIGS. 6 and 7. As shown, MO UE 106 sends a SIP INVITE to MT UE 116 via proxy call session control function (PCSCF) 902, SCCAS 220, e.g., a TAS, and PCSCF 904, each of which responds with a SIP 100 Trying indication. MT UE 116 then sends session-progress information, in the illustrated example a SIP 183 Session in Progress response including QoS information, to MO UE 106 via PCSCF 904, SCCAS 220, and PCSCF 902. PCSCF 904, a PCRF node 906, and a packet data network gateway (PGW) 908 then exchange messages to establish a dedicated bearer ("DB"): an Authorize/Authenticate Request (AAR), a Re-Auth Request (RAR), an Authorize/Authenticate Answer (AAA) and a Re-Auth Answer (RAA). In this example, PCRF 906 determines from the RAA that DB setup has failed (block 910). In response, PCRF 906 informs PCSCF 904 of the failure via exchange of an Abort Session Request (ASR), Abort Session Answer (ASA) which results in the PCSCF 904 exchanging a Session Termination Request (STR) and Session Termination Answer (STA) with the PCRF 906. PCSCF 904 then transmits a session-failure indication, e.g., a SIP 503 response, to SCCAS 220, e.g., in response to the ASR (as graphically indicated by the dashed arrow). SCCAS 220 then acknowledges the error in communication session, e.g., by sending a SIP ACK to PCSCF 904 or MT UE 116, and re-initiates the communication session as directed by the action data (block 912). This can be done, e.g., as described above with reference to blocks 606, 608, and 610, FIG. 6, and can include transmission of re-initiation messages ("Re-Init Message") to at least some of MO UE 106, MT UE 116, and core network components such as a signal transfer point (STP), omitted for brevity. Various examples of action data and re-initiation of communications sessions are discussed above with reference to data source 724, FIG. 7, and Table 1, above.

In some examples, block 912 includes transmitting a SIP INVITE/SDP to PCSCF 904 to retry, e.g., via a PS access network 108. In some examples, block 912 includes transmitting a Send Routing Information (SRI) request to an STP to retry, e.g., via a CS access network 110. In some examples, block 912 includes transmitting a SIP ACK to MT UE 116 or receiving a SIP 487 response from MT UE 116. In some examples, block 912 includes sending a retry invitation, e.g., a CS page, to MT UE 116, e.g., via CS access network 110. In some examples, block 912 includes sending a SIP INVITE request, a SIP 180 Ringing response, a page over a CS access network, or another signal triggering a core network device to resume or maintain communications with the user equipment or vice versa.

Block 912 and other above-described processing shown in FIG. 9 on the terminating side can be carried out independently of the setup of the originating side. In the illustrated example, originating-side setup includes exchange 914 of an AAR, RAR, AAA, and RAA involving PGW 908 and the resulting dedicated-bearer activation ("Activate DB").

FIG. 10 is a call flow 1000 showing an example of processes shown in FIGS. 6 and 7. The SIP INVITE and session-progress information are as discussed above with reference to FIG. 10. Exchange 1002 on the terminating side includes transmitting a request to MT UE 116 to activate a dedicated bearer. In the example shown, MT UE 116 fails to activate the dedicated bearer (block 1004). In response, MT UE 116 transmits session-failure information, e.g., a SIP 6xx, 5xx or 4xx (e.g., 480) response, to PCSCF 904 or another core network device. PCSCF 904 transmits session-failure information to SCCAS 220. In response, SCCAS 220 acknowledges the error and re-initializes the communication session (block 1006), e.g., as discussed above with reference to block 912, FIG. 9. Various examples of action data and re-initiation of communications sessions are discussed above with reference to data source 724, FIG. 7, and Table 1, above.

FIG. 11 illustrates an example process 1100 for initiating a communication session, the process performed by user equipment in a telecommunications network, e.g., MT UE 116, FIG. 1. In some examples, MT UE 116 includes a processor, one or more radios configured to selectively communicate via a first access network and via a second access network, and one or more components communicatively coupled to the radio and operated by the processor to perform operations described below.

At 1102, MT UE 116 receives an invitation message of a communication session with another device via the first access network. A pre-alerting phase 612 follows or commences with the receipt of the invitation message and precedes transmission of an alerting-progress message such as a SIP 180 Ringing response.

At 1104, MT UE 116 transmits, in response to the received invitation message and during the pre-alerting phase, a preconditions message.

At 1106, after block 1104, during the pre-alerting phase, MT UE 116 determines whether a failure condition preventing establishment of the communication session is present, e.g., by detecting the failure condition. For example, MT UE 116 can detect a DB setup failure such as that described above with reference to block 1004, FIG. 10. If there is a failure condition present, the next block is block 1108. If not, the process can terminate.

At 1108, MT UE 116 transmits, in response to the detection of the failure condition, an error code indicative of the failure condition.

At 1110, after transmitting the error code, MT UE 116 receives a second invitation message of the communication session via the second access network.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A telecommunications network, comprising:
a core network device communicatively connectable with user equipment, wherein the core network device is configured to:
receive session-progress information of a communication session with the user equipment;
subsequently, receive a session-failure indication;
determine action data based at least in part on the received session-failure indication, the determining including retrieving the action data from a data source mapping multiple, different instances of action data to multiple, different instances of session-failure indications and multiple, different access network types, with at least two different instances of session-failure indications mapping to two different access network types; and
in response to the action data indicating a retry, re-initiate the communication session via an access network indicated in the action data.

2. The telecommunications network of claim 1, wherein the core network device includes a telephony application server (TAS) or a service centralization and continuity application server (SCCAS).

3. The telecommunications network of claim 1, wherein the core network device is further configured to receive a session-commencing indication and provide the session-failure indication in response to expiration of a timeout period defined with reference to a time of receipt of the session-commencing indication.

4. The telecommunications network of claim 1, wherein the core network device is further configured to provide the session-failure indication in response to expiration of a timeout period defined with reference to a time of receipt of the session-progress information.

5. The telecommunications network of claim 1, further including a call session control function (CSCF) server communicatively connected with the core network device and configured to provide the session-failure indication in response to a failure to set up a dedicated bearer channel for the user equipment.

6. The telecommunications network of claim 1, wherein the core network device is further configured to initiate a communication session with the user equipment.

7. The telecommunications network of claim 1, wherein the telecommunications network further includes a first access network of a first type and a second access network of a second, different type and the core network device is further configured to initiate the communication session via the first access network and, in response to a selected error code in the received session-failure indication, provide the action data including an indication of the second access network.

8. The telecommunications network of claim 7, wherein the first type is a packet-switched (PS) network type and the second type is a circuit-switched (CS) network type.

9. The telecommunications network of claim 1, wherein the telecommunications network further includes a first access network of a first type and the core network device is further configured to initiate the communication session via the first access network and, in response to a selected error code in the received session-failure indication, provide the action data including an indication of the first access network.

10. The telecommunications network of claim 1, wherein the telecommunications network further includes a first access network of a first type and a second access network of a second, different type and the core network device is further configured to:
initiate the communication session via the first access network;
in response to a selected error code in the received session-failure indication, provide the action data further including an indication of a relative order of the first access network and the second access network;
carry out the re-initiating via the access network indicated first in the relative order in the action data; and
in response to receipt of a selected re-initiation error code, re-initiate the communication session via the access network indicated second in the relative order in the action data.

11. The telecommunications network of claim 1, wherein the core network device is further configured to determine the action data by retrieving the action data from the data source, and wherein the data source maps the action data to other information, and the other information includes at least one of an access-network type of the communication session, or a unique identifier of a radio carrying the communication session.

12. The telecommunications network of claim 1, wherein the core network device is further configured to, in response to the action data indicating no retry, transmit a session-failure indication to the user equipment.

13. The telecommunications network of claim 1, wherein the core network device is further configured to, before receiving the session-progress information:
receive a pre-progress session-failure indication;
determine pre-progress action data based at least in part on the received session-failure indication; and
in response to the pre-progress action data indicating a retry, re-initiate the communication session via an access network indicated in the pre-progress action data.

14. The telecommunications network of claim 13, wherein the core network device is further configured to determine the pre-progress action data by retrieving the pre-progress action data from the data source.

15. A method comprising:
- receiving, during a pre-establishment phase of a communication session, a session-failure indication;
- determining, by a processing unit, action data based at least in part on the received session-failure indication, the determining including retrieving the action data from a data source mapping multiple, different instances of action data to multiple, different instances of session-failure indications and multiple, different access network types, with at least two different instances of session-failure indications mapping to two different access network types; and
- in response to the action data indicating a retry, re-initiating the communication session via an access network indicated in the action data.

16. The method of claim 15, wherein the data source further maps the multiple, different instances of action data to other information, and the other information includes at least one of an access-network type of the communication session, or a unique identifier of a radio carrying the communication session.

17. The method of claim 15, further including receiving session-progress information of the communication session and, subsequently, performing the receiving session-failure, determining, and re-initiating.

18. The method of claim 17, further including, before receiving the session-progress information:
- receiving, by the core network device, a pre-progress session-failure indication;
- determining, by the core network device, pre-progress action data based at least in part on the received pre-progress session-failure indication; and
- in response to the pre-progress action data indicating a retry, re-initiating, by the core network device, the communication session via an access network indicated in the action data.

19. The method of claim 18, wherein the determining the pre-progress action data includes retrieving, by the core network device, the pre-progress action data from the data source.

20. User equipment comprising:
- a processing unit;
- one or more radios configured to selectively communicate via a first access network and via a second access network; and
- one or more components communicatively coupled to the radio and operated by the processing unit to perform operations including:
  - receiving an invitation message of a communication session with another device via the first access network, wherein a pre-alerting phase follows or commences with the receipt of the invitation message and precedes transmission of an alerting-progress message;
  - transmitting, in response to the received invitation message and during the pre-alerting phase, a preconditions message;
  - subsequently, detecting, during the pre-alerting phase, a failure condition preventing establishment of the communication session;
  - transmitting, in response to the detection of the failure condition, an error code indicative of the failure condition; and
  - subsequently, receiving a second invitation message of the communication session via the second access network
  - wherein an access network type of the second access network is selected by a core network based on the error code.

* * * * *